July 24, 1962 R. E. STOFFELS 3,046,340

TELEGRAPH SIGNAL ARRANGEMENT FOR A TELEPHONE SYSTEM

Filed March 28, 1961 8 Sheets-Sheet 1

INVENTOR.
Robert E. Stoffels
BY C. A. Gulbrandsen
Atty.

TELEGRAPH SIGNAL ARRANGEMENT FOR A TELEPHONE SYSTEM

Filed March 28, 1961 8 Sheets-Sheet 2

TABLE A

| SWITCH POS. | 1 | 2 | 3 | 4 | 5 | 6 | 7 | 8 | 9 | 10 |
|---|---|---|---|---|---|---|---|---|---|---|
| CHARAC. SENT | LF | CR | CR | LTR | Z | Z | X | A | CR | LF |
| LEV. B | | | | G | G | G | G | G | | |
| LEV. C | G | | | G | | | | G | | G |
| LEV. D | | | | G | | | G | | | |
| LEV. E | | G | G | G | | | G | | G | |
| LEV. F | | | | G | G | G | G | | | |

TABLE B

| SWITCH POS. | 1 | 2 | 3 | 4 | 5 | 6 | 7 | 8 | 9 | 10 |
|---|---|---|---|---|---|---|---|---|---|---|
| CHARAC. SENT. | LF | CR | CR | LTR | Z | Z | X | B | CR | LF |
| LEV. B | | | | G | G | G | G | G | | |
| LEV. C | G | | | G | | | | | | G |
| LEV. D | | | | G | | | G | | | |
| LEV. E | | G | G | G | | | G | G | G | |
| LEV. F | | | | G | G | G | G | G | | |

| | | | |
|---|---|---|---|
| FIG. 1 | FIG. 2 | FIG. 3 | FIG. 4 |
| FIG. 5 | FIG. 6 | FIG. 7 | FIG. 8 |

INVENTOR.
Robert E. Stoffels
BY
C. A. Gulbrandsen
Atty.

July 24, 1962 R. E. STOFFELS 3,046,340

TELEGRAPH SIGNAL ARRANGEMENT FOR A TELEPHONE SYSTEM

Filed March 28, 1961 8 Sheets-Sheet 3

INVENTOR.
Robert E. Stoffels

BY C. A. Gullbrandsen

Atty.

TELEGRAPH SIGNAL ARRANGEMENT FOR A TELEPHONE SYSTEM

Filed March 28, 1961 8 Sheets-Sheet 4

INVENTOR.
Robert E. Stoffels
BY
C. A. Gulbrandsen
Atty.

TELEGRAPH SIGNAL ARRANGEMENT FOR A TELEPHONE SYSTEM

Filed March 28, 1961 8 Sheets-Sheet 5

INVENTOR.
Robert E. Stoffels
BY [signature]
Atty.

July 24, 1962 R. E. STOFFELS 3,046,340

TELEGRAPH SIGNAL ARRANGEMENT FOR A TELEPHONE SYSTEM

Filed March 28, 1961 8 Sheets-Sheet 6

INVENTOR.
Robert E. Stoffels
BY C. A. Gulbrandsen
Atty.

July 24, 1962 R. E. STOFFELS 3,046,340

TELEGRAPH SIGNAL ARRANGEMENT FOR A TELEPHONE SYSTEM

Filed March 28, 1961 8 Sheets-Sheet 7

INVENTOR.
Robert E. Stoffels
BY C. A. Bullbrandsen
Atty.

July 24, 1962 R. E. STOFFELS 3,046,340

TELEGRAPH SIGNAL ARRANGEMENT FOR A TELEPHONE SYSTEM

Filed March 28, 1961 8 Sheets-Sheet 8

INVENTOR.
Robert E. Stoffels

BY [signature]
Atty.

United States Patent Office 3,046,340

Patented July 24, 1962

3,046,340 TELEGRAPH SIGNAL ARRANGEMENT FOR A TELEPHONE SYSTEM

Robert E. Stoffels, Glen Ellyn Woods, Ill., assignor to Automatic Electric Laboratories, Inc., Northlake, Ill., a corporation of Delaware Filed Mar. 28, 1961, Ser. No. 98,887
27 Claims. (Cl. 179—3)

This invention relates in general to the transmission of telegraph signals over telephone lines and more particularly relates to arrangements for permitting transmission of telegraph signals responsive to the automatic establishment of a connection between two telephone stations and to the means for automatically signaling and automatically controlling the response of the interconnected stations when the connection is completed between the calling and called stations.

This invention is a direct improvement over the Robert E. Stoffels application, Serial No. 774,212, filed November 17, 1958, wherein a call from one station to another is established via central office switching apparatus, and when the called station is rung, it responds by automatically transmitting a "go-ahead" signal to the calling station. The signal, on being received at the calling station, causes the calling station to transmit a message to the called station, and when neither station has a message to transmit the connection is automatically released after a short time delay. In addition this application provides security controls so that no messages are transmitted in case the call to a called station is in a different network than the calling station. Calls from a calling station in one network to a called station in a different network are unauthorized calls. The security controls require the tape to be perforated with heading information including the network code of all the stations authorized to transmit and receive messages and with the individual station code and when a received heading indicates that the calling station is not in the same network as the called station then no messages are transmitted and the connection is released. The security controls may be disabled by operating a no identification key so that any calling station may transmit and receive messages from any called station regardless of the network such stations are included in.

In the present invention the main object is the provision of means whereby the heading information including the network and station codes are automatically transmitted without the necessity of first perforating a tape with such heading information whenever a station desires to send a message to a called station requiring the identification of the calling station, and, therefore, only the message to be sent need be perforated in the tape.

Another object of the present invention is the provision of means whereby, when the operator is perforating a tape for message transmission and during such time an incoming call is received from another station, the page printer, which is printing the copy as the tape is being prepared, is switched to the incoming call. Thus, no incoming calls are incompleted because a tape is being prepared.

A further object of the present invention is the provision of means whereby, when a prepared tape is being tested for accuracy, the telephone line is opened and the distant calling station trying to reach this line will get a "no answer" indication.

In the present invention the telephone transmitter at a station is not included in the line circuit except when an alarm condition exists, and a feature of this invention is the provision of means whereby the calling station may connect the telephone transmitter to the line and talk to and request a telephone operator to complete a connection to a desired called station, after which the calling station initiates message transmission.

Other objects and features of this invention will become apparent in perusal of the following specification, claims, and associated drawings.

FIGS. 1 to 8, inclusive, diagrammatically represents the apparatus at one of the stations which is connected over a telephone line to a central office automatic telephone exchange, it being understood that similar stations are similarly equipped and connected to a telephone exchange. FIG. 9 shows the alignment for FIGS. 1 to 8.

FIG. 1 diagrammatically shows a conventional telegraph transmitter and distributor, and a rotary step-by-step switch having its banks wired in accordance with the heading information required for station identification.

FIG. 2 shows a polar differential relay 230, signal receiving relays 210 and 220, Table A designating the heading information and the manner in which the rotary switch banks in FIG. 1 is wired for station A, while Table B designates the heading information and the manner in which the rotary switch bank is wired for another station, such as station B. Stations included in the same network have similar tables with the same network code but different, or individual, station codes.

FIG. 3 shows two channel units each having tone equipment, one unit being used for transmitting and receiving space and mark frequencies and for converting such frequencies to direct current, and a supervisory circuit designating a "no tone detecting" circuit. The other channel unit 2 is similar to channel unit 2 but has no tone detecting circuit and this unit is used to transmit and receive the "go-ahead" signal and the alarm signal.

Figure 5:
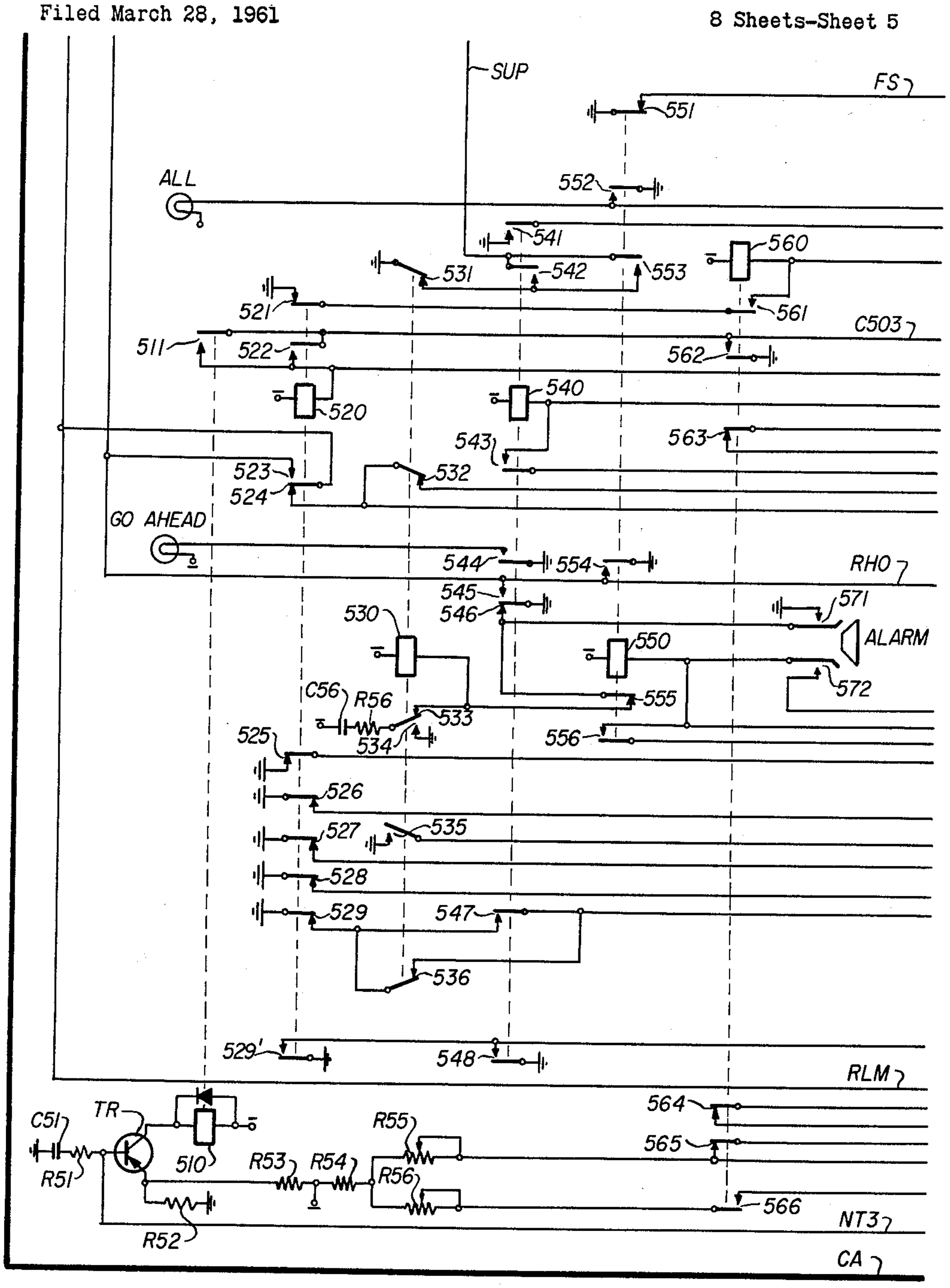
FIGS. 5, 6, 7 and 8 show the detail circuits of the control relay assembly.

FIG. 5 also shows an Alarm push button and the go-ahead signal lamp.

Figure 6:
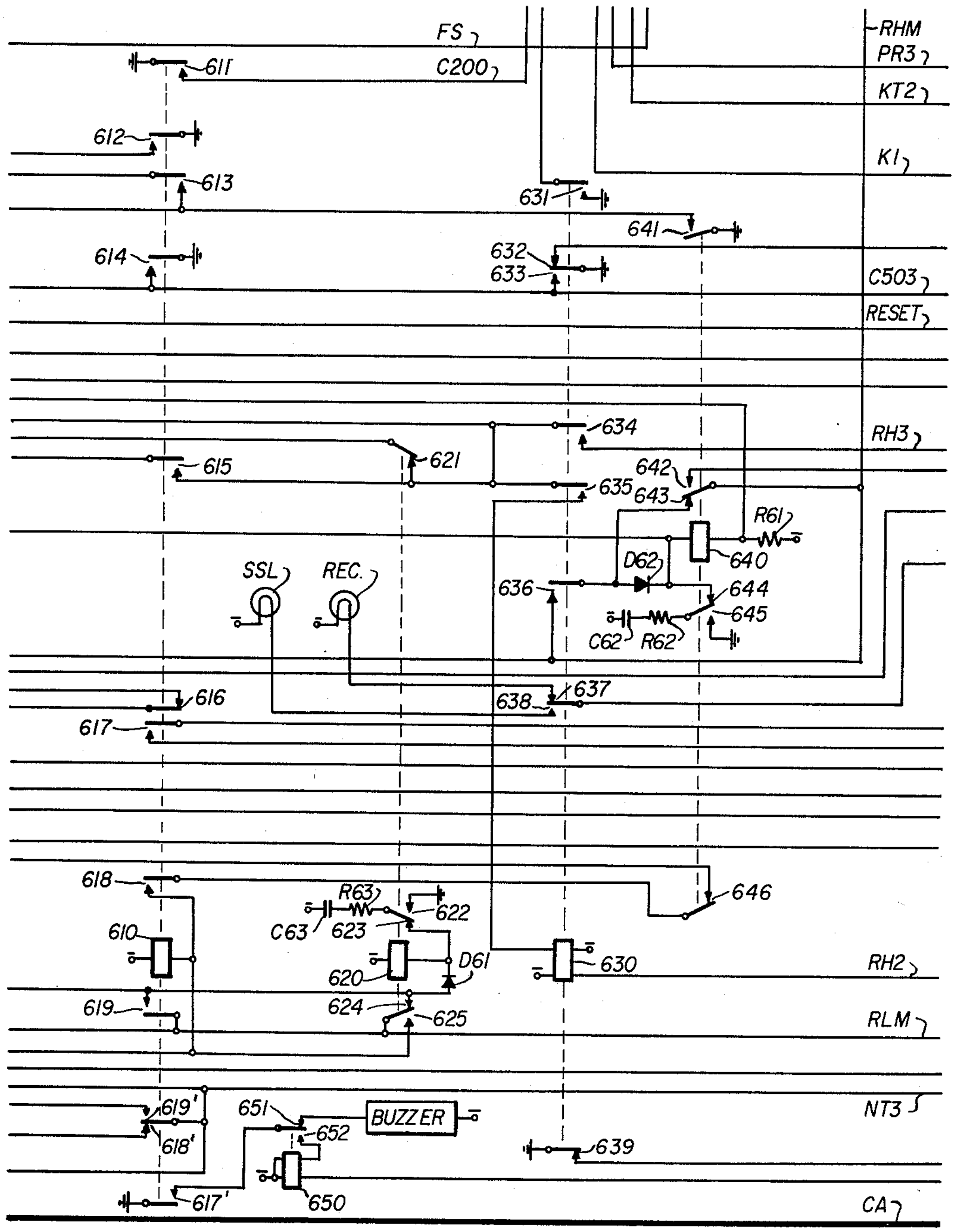

FIG. 6 also shows the send and receive lamps, SSL and REC and a buzzer.

Figure 7:
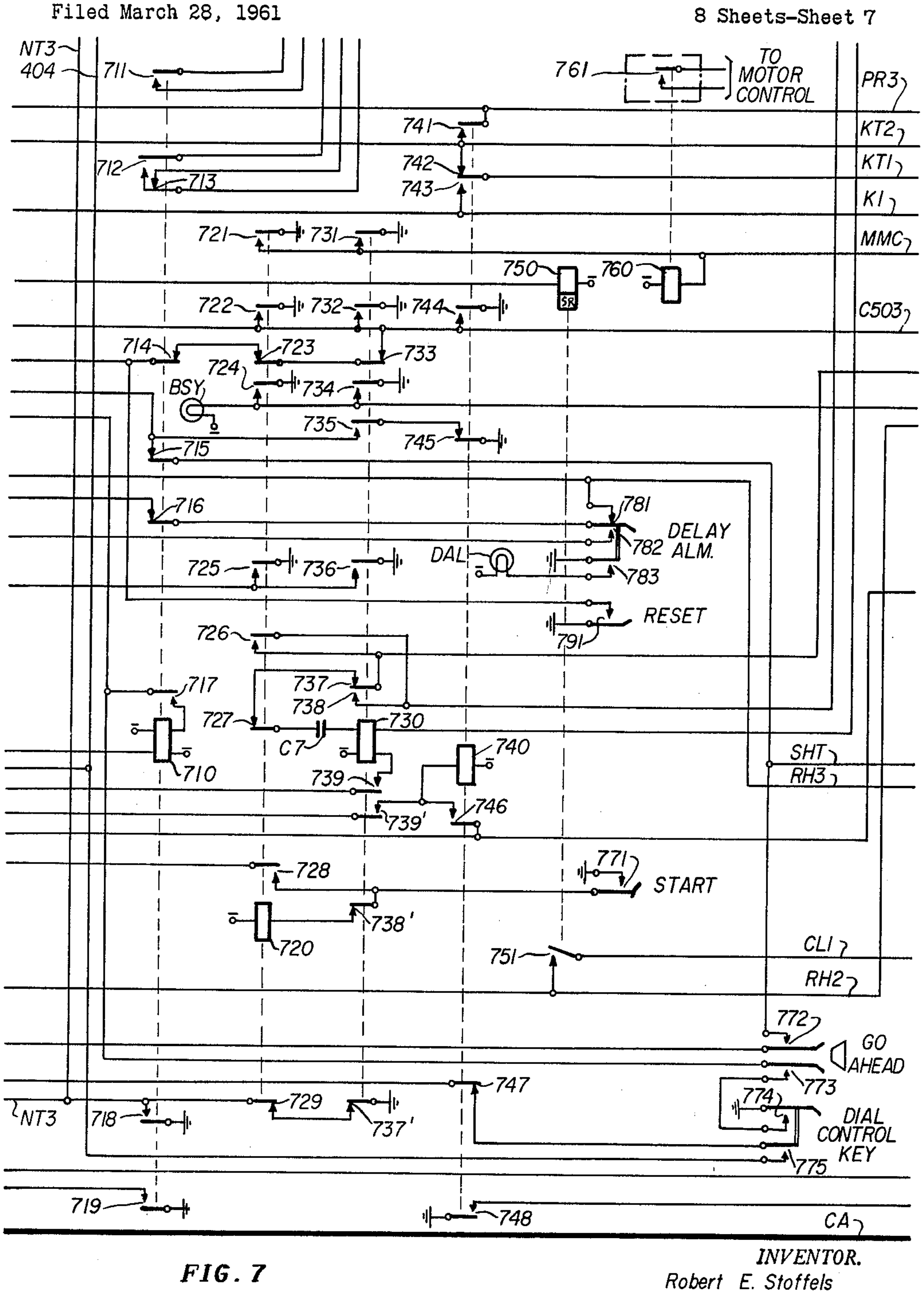

FIG. 7 also shows a Delay Alarm key, the busy lamp BSY, a Start push button, a go-ahead push button, and a Dial Control key.

Figure 8:
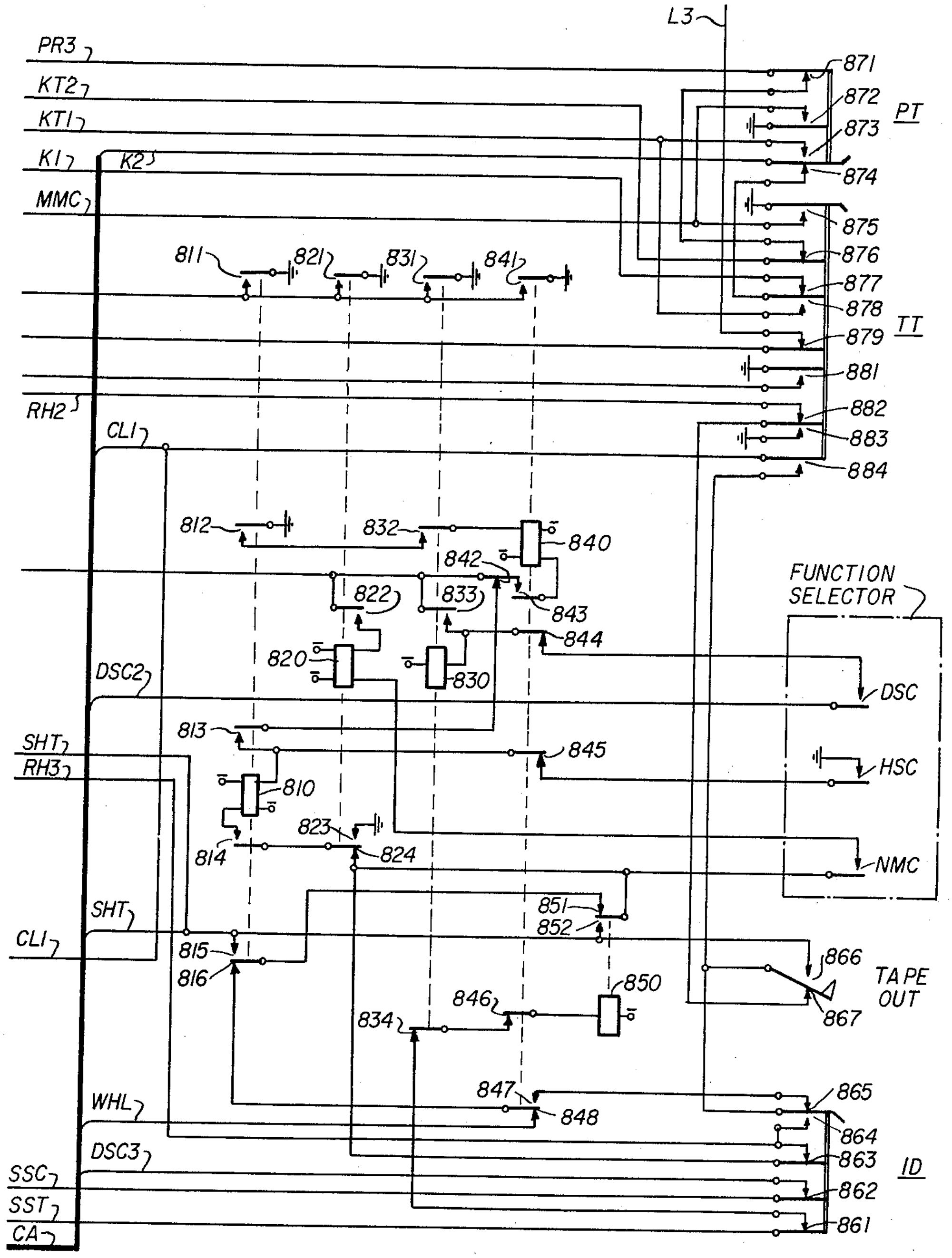

FIG. 8 also shows a prepare tape key PT, a test tape key TT, a function selector, the tape-out contacts which are controlled by the tape, and an identification key ID.

Figure 3:
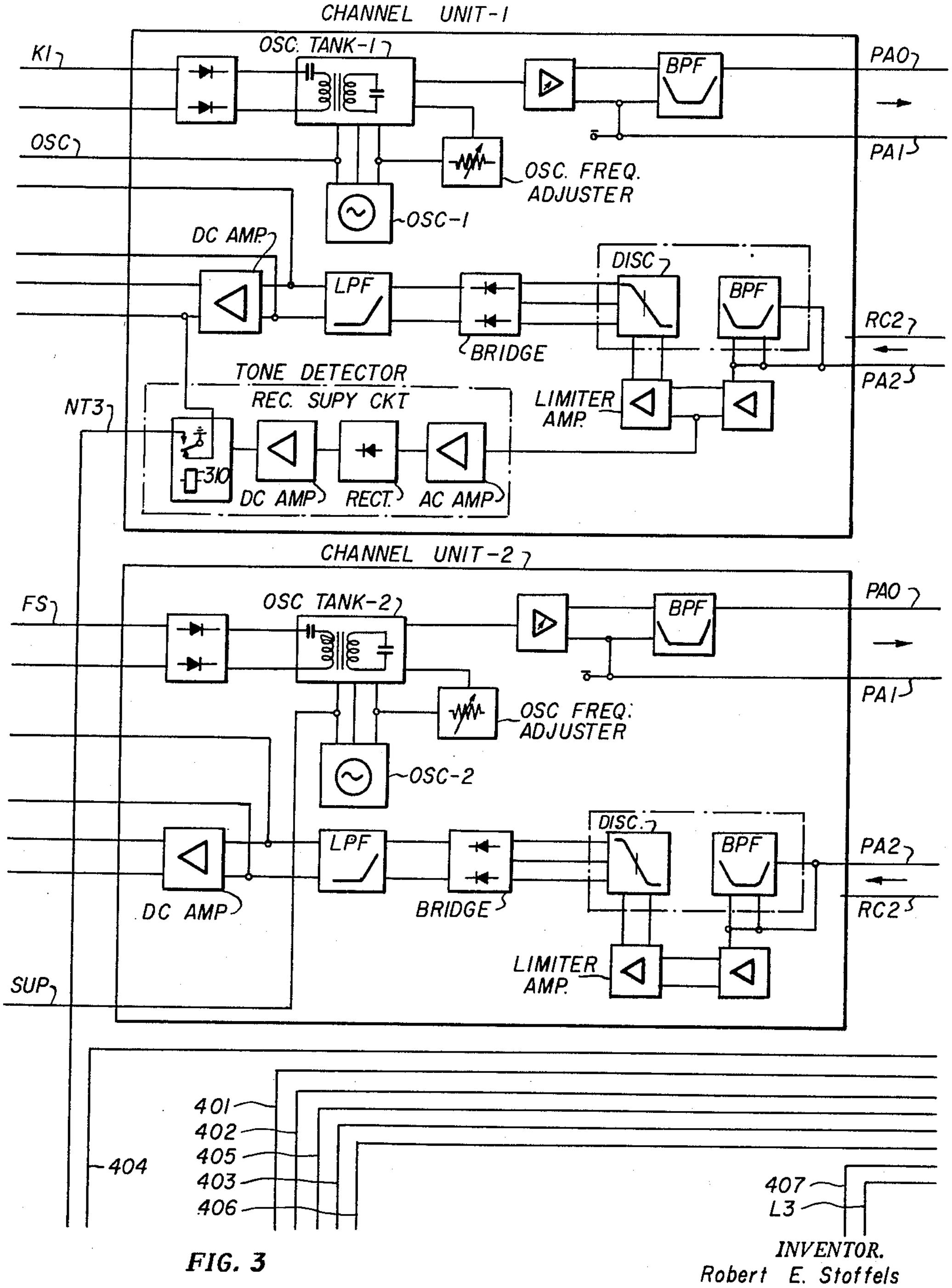
Figure 4:
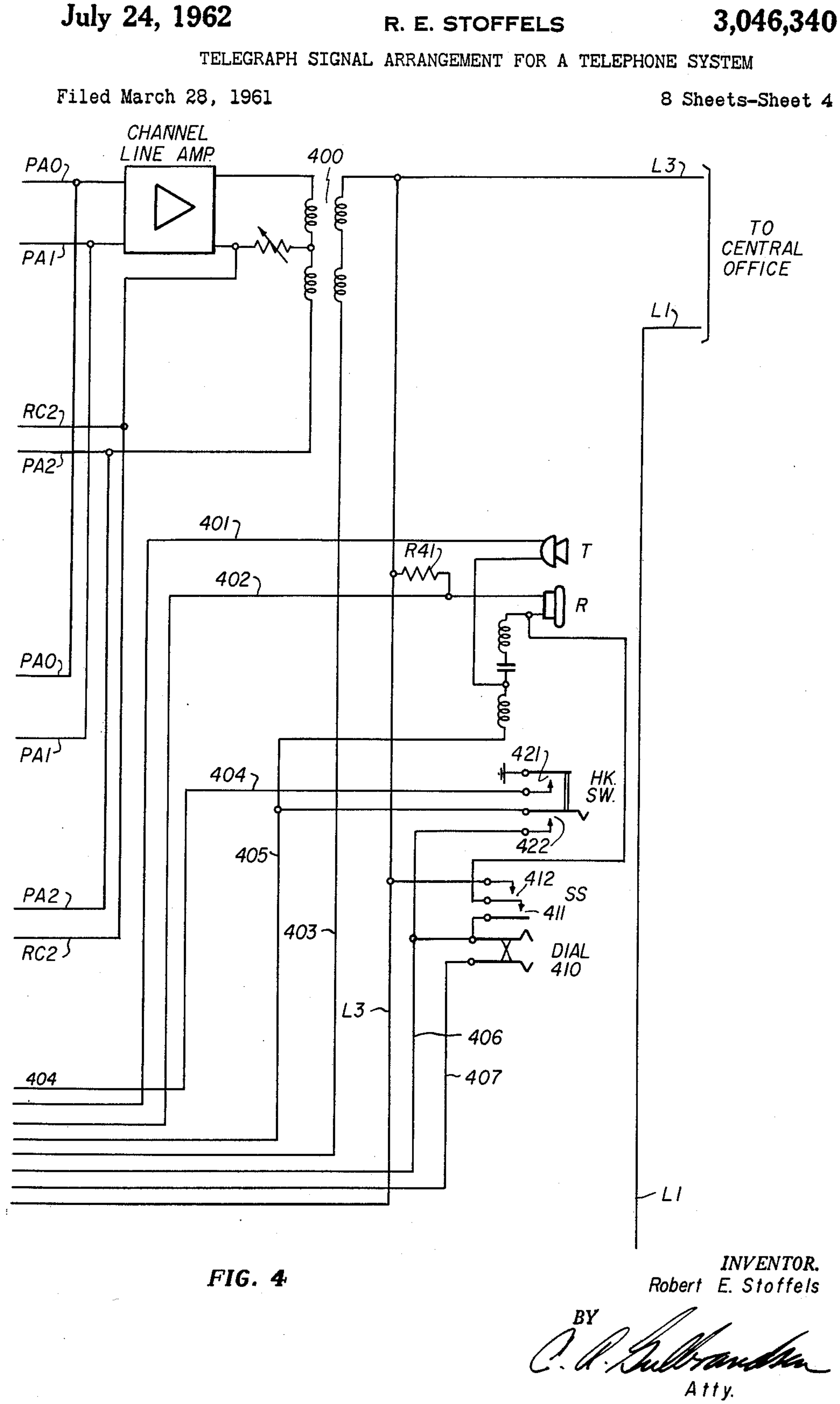
FIG. 4 shows a channel line amplifier and a transformer, or repeating coil, connected to the channel units, the station telephone handset comprising a telephone transmitter and receiver, switch-hook springs, the dial, or calling device, and the line conductors extending to the central office which for purposes of illustration is assumed to be an automatic telephone exchange.

The tone equipment in the channel unit 1, shown in FIG. 3 uses the standard Lenkurt Type 23A Telegraph Carrier equipment and is entirely transistorized, operating on a frequency-modulated basis. The transmitter portion consists of a high-stability self-controlled oscillator shifted in frequency in accordance with the direct current mark and space pulses received from the teletypewriter equipment. A diode modulator is used to insert or remove a shift capacitor from the oscillator tank circuit. The oscillator is of the regenerative flip-flop type whose oscillations are limited by clipping in both transistors. The output of the oscillator is fed to an amplifier, then through a band pass filter, and then through a channel line amplifier and output transformer, or repeating coil to the telephone line. In the receiving equipment, both incoming and outgoing signals are fed through a band pass filter and a single stage amplifier to a limiter and the output from the limiter feeds a discriminator of the double tuned series-resonant type. One mesh is tuned to a frequency close to the mark frequency, and the other mesh is tuned to a frequency close to the space frequency. The discriminator therefor detects the change in frequency between the mark and space frequencies. The output of each mesh is bridge-rectified, and the two currents are combined differentially. The resultant signal then feeds two power transistors connected as direct current amplifiers, and the final output controls a polar differential relay, such as relay 230, in accordance with the mark and space frequencies transmitted.

Near the limiting stage of the receiver, a portion of the signal is tapped off and fed through two stages of amplification. The second stage is connected as a direct current amplifier, and this output feeds a supervisory relay, such as relay 310, which is released if a tone is present and operated if there is no signal. This circuit arrangement provides a "no-tone" detector in channel unit 1 for controlling a timing circuit.

The channel units are of the type described in the Lenkurt Bulletin entitled "Engineering Considerations, datatel, Type 23A Telegraph Carrier Equipment," "Form 23A-Eng., Issue No. 1, December 1958."

The tone equipment in channel unit 2 in FIG. 3 is similar to the tone equipment of channel unit 1 except that a "no-tone" detector is not provided therein. In this unit the carrier frequency is shifted to send a high frequency for a "go-ahead" signal and a lower frequency for an alarm signal to respectively control the go-ahead signal relay 210 and the alarm signal relay 220.

The function selector shown in FIG. 8 is of the type shown and described in Patent 2,667,533, issued to W. J. Zenner on January 26, 1954, and more particularly shown and described in Bulletins No. 216B and 1194B entitled "Teletype Printing Telegraph Systems," "General Description and Theory of Operation," and "Parts" respectively issued by Teletype Corporation and copyrighted in 1953. It is otherwise known as a function box, junction selector mechanism, or stunt box and is associated with the telegraph signal recording apparatus. It is arranged to respond to a number of different code combinations which may appear in a telegraph message, for closing contacts corresponding to each code combination. The recording apparatus responds to the receipt of the start-of-message indications LF, CR, CR, LTR and operates code bars to enable the operation of the function selector. At the calling station the home station contacts HSC are closed by the network code Z2 and the individual station code while at the called station, the distant station contacts DSC are closed by receipt of the network code Z2 and the individual station code of the calling station. The end of heading code CR, LF is transmitted after the individual station code and this end of heading code renders the function selector non-responsive to further message character signals.

*Brief Description of Operation*

An attendant desiring to transmit or receive a message to or from a called station momentarily depresses the start button thereby applying power to the electronic equipment and starting the motor of the teletypewriter machine, and listens for dial-tone at the handset. After receipt of dial-tone the attendant dials the number of the distant station to complete the connection and rings the called distant station in any well-known manner. Ringing current at the called station operates a relay which applies power to the tone equipment, turns on the motor of the teletypewriter machine, and prevents message sending from the called station.

Figure 1:
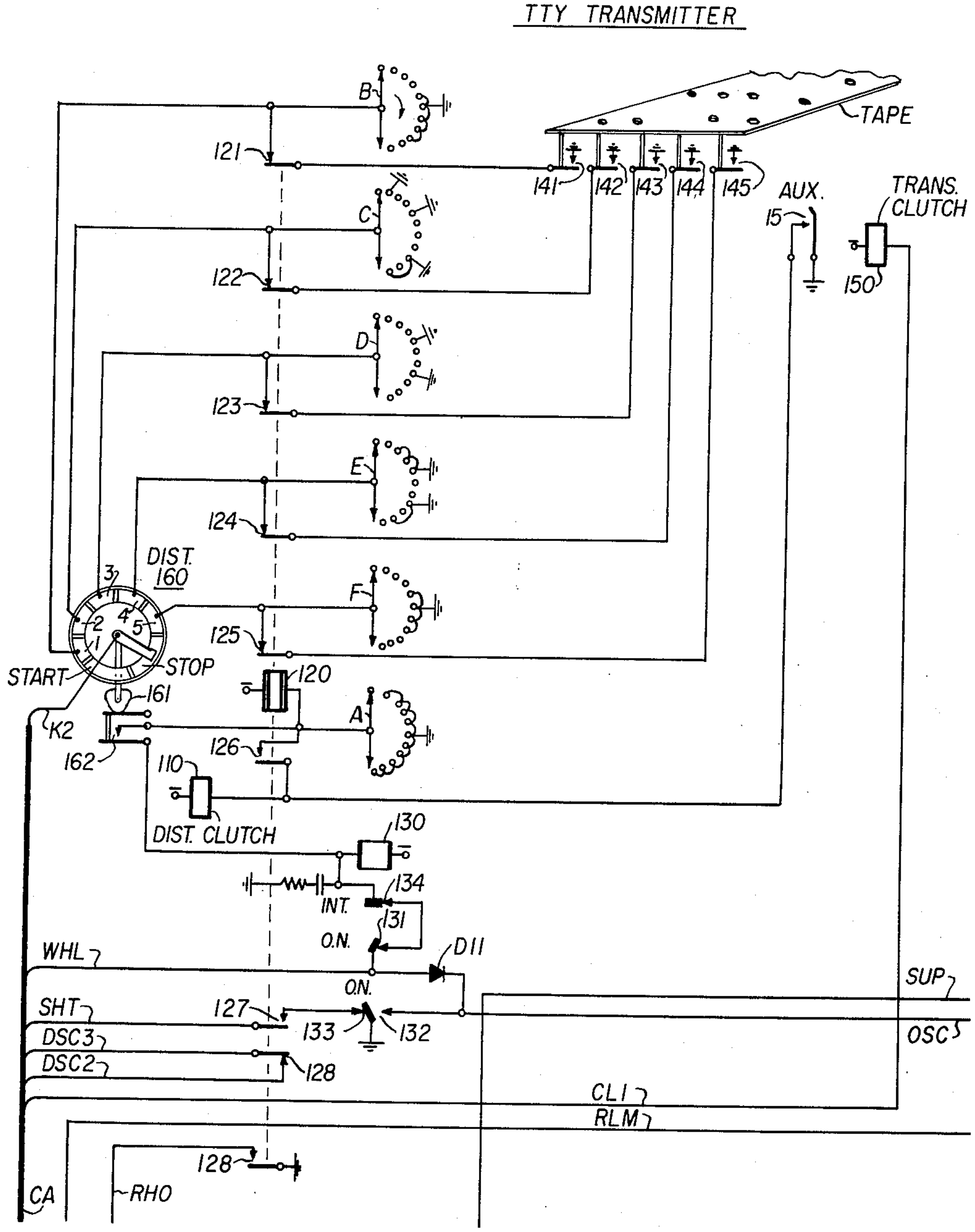
Figures 2, 9:
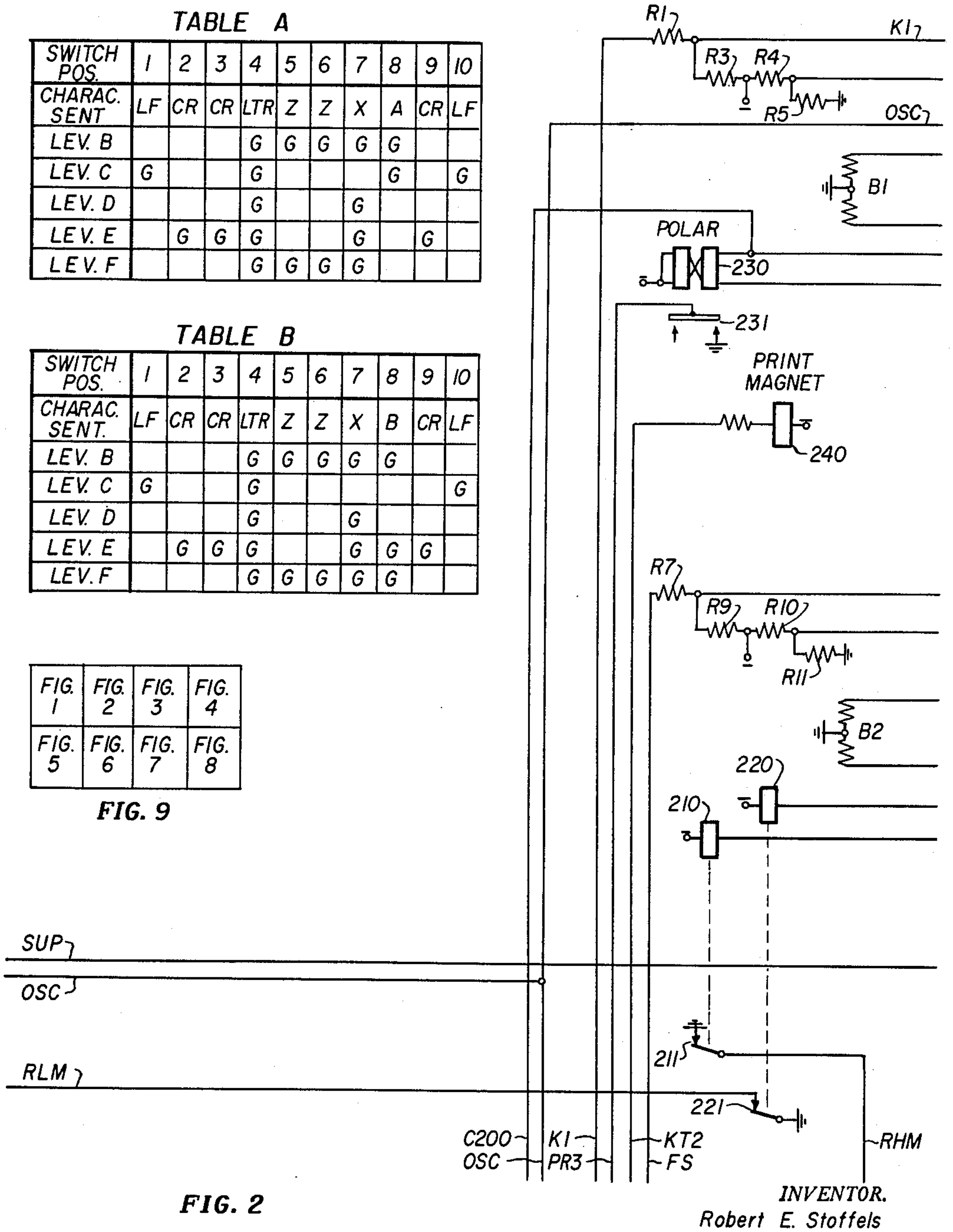

The called station now automatically sends a "go-ahead" signal to the calling station. The receipt of this "go-ahead" signal at the calling station automatically operates the rotary switch associated with the teletypewriter tape transmitter to modulate the FM tone equipment to send space and mark frequencies in accordance with the heading information wired to the rotary switch banks as shown in FIG. 1 and in Table A (FIG. 2). This heading information includes the start-of-message code LF, CR, CR, LTR which enables the function selector (FIG. 8), includes the network and calling station codes Z2 and XA which causes the calling station function selector to close home station contacts HSC and the called station function selector to close the distant station contacts DSC, and includes the end of heading code CR, LF which renders the function selector non-responsive to further message character signals.

The closure of the HSC contacts at the calling station causes transmission of a "go-ahead" signal to the called station thereby causing the called station to transmit its heading information registered in the rotary switch at the called station. The function selectors at both the calling and called stations again operate, the calling station function selector closing the distant station DSC contacts and the called station closing the home station HSC contacts. The closure of the called station contacts HSC then causes the transmission of a "go-ahead" signal to the calling station.

The closure of the calling station distant station contacts DSC and the receipt of the "go-ahead" signal from the called station switches the transmission from the rotary switch to the tape transmitter which now sends the message perforated in the tape to the called station.

This closure of the home and distant station contacts HSC and DSC as above described are required if the identification key ID, FIG. 8, is in normal position as shown. If for some reasons these station contacts in the function selector are not operated then no messages are transmitted and the connection is released.

With proper identification, the message in the tape is transmitted and at the end of the message the tape-out contacts (FIG. 8) operate. This releases the transmitter clutch magnet and initiates the transmission of a "go-ahead" signal to the called station. The receipt of this "go-ahead" signal causes the called station tape transmitter to transmit its message to the calling station after which it transmits another "go-ahead" signal to the calling station. If the calling station has another message to send it will send this other message. If the calling station does not have another message then the tape-out contacts are operated to cause the calling station to send a "go-ahead" signal to the called station. If the called station also has no message to send then the tape-out contacts are operated to cause the called station to send a "go-ahead" signal to the calling station. This back and forth "go-ahead" signaling will continue for several seconds and at the end of this time the signal detecting unit will time out and the established connection will be automatically released.

In case the identification key ID is operated then no identification is required and in response to the receipt of a "go-ahead" signal, the rotary switch circuits are disabled and the message on the tape is then transmitted without the heading information controlled by the rotary switch.

An operator at either station can, at any time, initiate an alarm condition by operating the Alarm button. This causes a low tone to be transmitted to the line which is received at both the calling and called stations. This "alarm" signal stops transmission, prevents time-out, lights an alarm lamp, sounds a buzzer and connects the telephone transmitters in the circuit to enable the attendants at both stations to converse. The alarm condition is cleared by an attendant at either station operating the "go-ahead" button to allow resumption of message transmission. If the called station is unattended and the alarm condition is not answered at the called station, then the calling station attendant can release the alarm. In case the alarm persists for one minute without being answered then the connection is automatically released.

A "delay alarm" key is operated in case it is desired that the attendant wishes to discuss a message with the distant station attendant. In this case the receipt of the "go-ahead" signal will, insead of starting the transmitter, cause an alarm signal to be sent.

In case a telephone connection to a desired called station can only be completed with the aid of a manual telephone operator, a Dial Control key is operated and the Start button is operated causing the telephone transmitter to be connected to the line. The calling station passes the necessary instructions to the telephone operator to complete the connection to the called line. When the distant station answers, the calling station replaces the handset on its cradle and presses the "go-ahead" button causing message transmission from the calling station.

*Detail Description*

Having given a brief description of the invention a detail description of the sequence of operations will now be given when network and station identification is required before messages may be transmitted.

In order to initiate a call an operator at the calling station momentarily operates the Start key, FIG. 7, thereby completing a circuit for operating the calling relay 720 from ground by way of contacts 771 and 738'.

Relay 720 at contacts 721 completes the circuit for operating motor control relay 760 which operates and at contacts 761 completes the circuit for operating the motor of the associated teletypewriter machine (not shown). Contacts 723 open before contacts 722 close to prevent grounding the reset conductor while contacts 722 ground the locking conductor C503. At contacts 724 relay 720 operates the busy lamp BSY; at contacts 725 lights the receive lamp REC by way of contacts 637; at contacts 726 bridges the dial contacts in series with the right-hand winding of the repeat coil 400 and the receiver circuit of telephone receiver R across the line conductors L3 and L1 extending to the automatic central office; at contacts 727 opens the circuit to the called relay 730; at contacts 728 completes its locking circuit to ground at contacts 528; and at contacts 729 disconnects ground from conductor NT3 to initiate a "time-out" circuit which will be more fully explained hereinafter.

The circuit bridging the dial 410 and repeat coil 400 across the line conductors may be traced as follows: line conductor L3, right-hand winding of coil 400, conductor 403, contacts 713, conductor 406, dial contacts 410, conductor 407, contacts 726, conductor L4, contacts 874 to line conductor L1. In case the handset is removed from the cradle then the telephone receiver R is included in bridge of the line conductors as follows: line conductor L3, resistance R41, receiver R, induction coils and associated condensers, conductor 405, switch-hook contacts 422, dial contacts 410, conductor 407, contacts 726, conductor L4, contacts 879 to line conductor L1.

The automatic apparatus in the automatic central office operates in the well-known manner and sends dial tone back to the calling station over the line conductors. After receipt of dial tone the calling station will automatically dial the number of the called station to complete a connection thereto. The operation of the dial 410 at the calling station also closes shunt springs 411 and 412 to short circuit both the receiver and the right-hand winding of the repeat coil 400.

The called station is similar to the calling station and when the connection is established to the called station ringing current is connected over line conductors L3 and L1 to operate the called relay 730 as follows: line conductor L3, relay 730, condenser C7, contacts 727 and 737, conductor L4, contacts 879 and line conductor L1.

Relay 730 at the called station operates and closes its locking circuit by way of contacts 739 to ground at contacts 526. At contacts 731 relay 730 completes the circuit for operating motor relay 760 which closes contacts 761 to start the teletypewriter motor. Contacts 733 open before contacts 732 close to prevent grounding the reset conductor and contacts 732 later grounds locking conductor C503. Contacts 734 light the busy lamp BSY and contacts 735 complete a circuit from ground at contacts 745 for operating the signal relay 540. Contacts 736 complete a circuit by way of contacts 637 for lighting the receive lamp REC. Contacts 738 bridge the repeat coil 400 across the line conductors as follows: line conductor L1, contacts 879, conductor L4, contacts 738, conductor 407, dial 410, right-hand winding of coil 400 to line conductor L3. Contacts 739' prepare a circuit for the called slave relay 740, contacts 738' opens the circuit to the calling relay 720, and contacts 737' initiate the operation of a similar time-out circuit.

Signal relay 540 at the called station operates and at contacts 542 grounds conductor SUP to operate the oscillator OSC–2 in the channel unit 2. Contact 543 completes a locking circuit for relay 540 as follows: from ground contacts 221, RLM conductor, contacts 524, 532, 621 and 543. Contacts 544 light the go-ahead lamp, contacts 545 establish another holding circuit for relay 640, contacts 546 open the circuit to the interrupter relay 530, and contacts 548 establish another holding circuit for relay 620.

Oscillator OSC–2 at the called station operates and since conductor FS is grounded at contacts 551, the potential via the network comprising resistors R7, R9, R10, and R11 causes a high frequency tone signal, hereinafter called the "go-ahead" signal, to be transmitted to the channel line amplifier which sends this tone signal to the called station by way of repeat coil 400 and line conductors L3 and L1 and also sends this tone signal locally through channel unit 2 to restore only relay 210 while relay 220 is maintained operated. Polar differential relay 230 or the "no-tone" relay 310 in channel unit 1 do not respond during transmission or receipt of this go-ahead signal.

Relay 210 at the called station restores in response to the local receipt of this go-ahead signal and at contacts 211 disconnects ground from conductor RHM over which relay 640 is normally operated but relay 640 does not at this time restore since it is now held operated from ground at contacts 545.

The interrupter relay 530 is slow to release due to the condenser C56 and resistor R56 network connected over contacts 533 to render the relay slow to release in a well-known manner. Relay 530 is made slow to release so that the go-ahead signal is sent for the duration of the release time of relay 530. After a predetermined interval, as determined by the capacity of condenser C56 and resistance of resistor R56, relay 530 restores and at contacts 531 opens the circuit to oscillator OSC–2 to terminate the go-ahead signal. At contacts 532 the locking circuit to relay 540 is opened; at contacts 533 the slow-to-release circuit of relay 530 is opened, at contacts 534 condenser C56 is receiving a charge through resistor R56; and at contacts 535 called slave relay 740 is operated by way of contacts 739'.

Relay 740 at the called station operates and at contacts 741 prepares a circuit for the Print Magnet 240. At contacts 745 relay 740 opens the circuit to signal relay 540 which now releases. At contacts 746 relay 740 completes its locking circuit to ground at contacts 527, and at contacts 748 completes a circuit by way of conductor SST, key contacts 861, contacts 834 and 846 for operating relay 850.

Relay 850 at the called station operates and opens contacts 851 to prevent message transmission from the called station.

Relay 540 restores to extinguish the go-ahead lamp at contacts 544 and at contacts 546 reoperates interrupter relay 530.

When the go-ahead signal is terminated at the called station the relay 210 is reoperated to ground conductor RHM at contacts 211 to hold relay 640 operated over contacts 643 and rectifier D62.

At the calling station and in response to the receipt of the first go-ahead signal from the called station relay 210 restores and at contacts 211 disconnects ground from conductor RHM to release relay 640 after a short time delay as determined by the condenser C62 and resistor R62 network connected to relay 640 by way of contacts 644.

Relay 640 at the calling station restores and at contacts 641 operates relay 560, at contacts 642 prepares a circuit for operating the rotary switch (FIG. 1) and starting the oscillator OSC–1 in channel unit 1, and at contacts 645 charges condenser C62 via resistor R62.

Relay 560 operates and locks by way of contacts 561 and 521, grounds locking conductor C503 at contacts 562, opens the shunting circuit of relay 640 or the holding circuit to relay 710 at contacts 563, opens a possible circuit to relay 610 at contacts 564, opens the one minute time out circuit at contacts 565, and at contacts 566 completes the ten second time out circuit.

When the first go-ahead signal from the called station is terminated relay 210 reoperates and grounds conductor RHM to operate the motor magnet 130 of the rotary switch and to ground conductor OSC to start oscillator OSC–1 as follows: ground contacts 211, conductor RHM, contacts 642 and 716, key contacts 781, conductor RH3, key contacts 863, contacts 851, 816 and 848 of the security relays, conductor WHL in cable CA, off-normal contacts 131, interrupter contacts 134, and magnet 130 to battery. A branch of this circuit extends from conductor WHL by way of rectifier D11 and conductor OSC to operate oscillator OSC–1. In the well-known manner magnet 130 energizes and at contacts 134 interrupts its own circuit to cause magnet 130 to restore and operate the wipers of the rotary switch one step into engagement with their first bank contacts. On the first step of the wipers off-normal contacts 131 open the original circuit of magnet 130 and off-normal contact close to maintain ground on conductor OSC to continue the operation of oscillator OSC–1.

Wiper A in engagement with its first and succeeding bank contacts encounters ground to operate the slow-to-release relay 120. Relay 120 operates and at contacts 121 to 125, inclusive, opens circuits to the tape reader of the teletypewriter transmitter. At contacts 126 relay 120 completes a circuit by way of the A bank and wiper for operating the distributor clutch magnet 110 thereby starting the distributor. At contacts 127 relay 120 prepares a circuit for operating signal relay 540, at contacts 128 opens a possible circuit for operating relay 830, and at contacts 129 completes a circuit over conductor RHO to reoperate relay 640. Relay 640 at contacts 642 opens the orginal circuit to motor magnet 130, at contacts 643 re-establishes its holding circuit over conductor RHM, and at contacts 644 re-establishes its slow release circuit.

At the calling station the distributor is operated in the well-known manner and as relay 120 has disconnected the tape reader character codes are transmitted under control of the rotary switch as it automatically steps the wipers to engage the bank contacts which are grounded in accordance with Table A in FIG. 2. As will be seen the banks of the rotary switch are wired to ground in accordance with the heading information required for station identification. For example the first character of the heading information is LF and the first bank contact of level C is grounded; the second character is CR and the second bank contact of level E is grounded; the third character is CR and the third bank of level E is grounded; the fourth character is LTR and the fourth bank contacts in levels B, C, D and F are all grounded; the fifth character is Z and the fifth bank contacts of levels B and F are grounded, and the remaining characters Z, X, A, CR, and LF ground corresponding bank contacts in a similar manner as indicated in Table A and as shown in FIG. 1.

Space frequency is now being transmitted by channel unit 1 to both the calling and called stations to control the operation of the polar differential relays 230 at both the calling and called stations but since the transmitter clutch magnet 150 at these stations is not operated at this time the tape transmitter at these stations are not operated. During the transmission of space and mark frequencies the no-tone detector relay 310 is restored to ground conductor NT3 which disables the time-out circuit by preventing the charging of condenser C51 (FIG. 5).

At the calling station the brush of the distributor revolves in the well-known manner to engage its respective segments. In engagement with segment 1 the distributor brush fails to find ground on the first bank contact of level E with the result that space frequency is transmitted during this interval. However, when the distributor brush engages its second segment ground on the first bank contact of level C is encountered and this ground causes the oscillator to shift from a space frequency to a mark frequency to thereby transmit a mark frequency for this interval of the distributor brush travel. When the distributor brush is grounded, a circuit may be traced by way of conductor K2 in cable CA, key contacts 874 and 877, conductor K1 to resistors R1, R3, R4 and R5 to send a mark pulse to channel unit 1 which causes the unit to shift from space frequency to mark frequency transmission. When the distributor brush leaves segment 2 and engages segment 3 no ground is encountered with the result that channel unit 1 now transmits space frequency. The distributor brush engaging segments 4 and 5 fails to find ground with the result that on the first revolution of the distributor the character LF has been transmitted.

During the revolution of the distributor cam 161 closes contacts 162 to complete a circuit from ground by way of wiper A and bank contacts for operating motor magnet 130. When the distributor brush reaches its stop position cam 161 opens contacts 162 to restore magnet 130 to cause the wipers of the rotary switch to step to their second bank contacts. Since the distributor clutch magnet 110 is operated over contacts 126 and level A the distributor continues in its second revolution to send the second character CR due to the ground encountered by the distributor brush from level E when it engages segment 4. During this second revolution of the distributor brush the second character CR is transmitted by channel unit 1 in a manner similar to that described for the first transmitted character. Each revolution of the distributor brush causes the rotary switch to take another step and causes the channel unit 1 to shift from space to mark frequency as the distributor brush encounters ground by way of its successive segments and grounded bank contacts of the successive levels of the rotary switch. In a manner apparent from the foregoing description the heading information of Table A is transmitted to both the calling and called stations.

This heading information includes a start-of-message code comprising characters LF, CR, CR and LTR; a network code ZZ, an individual station code XA, and an end-of-heading code CR, LF.

At the calling station and in response to the receipt of each mark frequency the polar differential relay 230 is operated to close contacts 231 to complete a circuit for operating the Print Magnet 240 of the recording apparatus. This circuit may be traced from ground contacts 231, conductor PR3, key contacts 871 and 876, conductor KT2, to magnet 240 and battery. Print Magnet 240 operates to print and record the transmitted characters and controls the operation of the function selector in response to predetermined character codes. In response to the receipt of the start-of-message code LF, CR, CR, LTR, code bars are operated to enable the operation of the function selector. In response to the receipt of the network code and the individual station code ZZ, XA, the home station contacts HSC at the calling station close, while at the called station the distant station contacts DSC close. In response to the receipt of the end-of-heading code CR, LF the function selector is disabled.

At the calling station, home station contacts HSC operate in response to the network and calling station code to operate relay 810 over the following circuit: ground, contacts HSC and contacts 845. Relay 810 at contacts 811 grounds the lock conductor C503, at contacts 812 prepares a circuit for relay 840, at contacts 813 locks by way of contacts 842 and 527, at contacts 816 opens the previously traced circuit for initiating the operation of the rotary switch, and at contacts 815 prepares a circuit for relay 540.

When the rotary switch at the calling station has completed one revolution and stepped its wipers to normal, off-normal contacts 131 close without effect, off-normal contacts 132 disconnect ground from conductor OSC to stop oscillator OSC–1, and at off-normal contacts 133 grounds conductor SHT by way of contacts 127 to operate signal relay 540. The rotary switch in normal position opens the circuit to the slow-to-release relay 120 and the circuit to the distributor clutch magnet 110 to stop the distributor. After a short interval relay 120 restores to connect the tape reader of the teletypewriter transmitter to the distributor segments at contacts 121 to 125, inclusive; opens the circuit to the distributor clutch magnet 110 at contacts 126, disconnects ground from conductor 127 after relay 540 has operated and locked; at contacts 128 prepares a circuit for relay 830; and at contacts 129 disconnects ground from conductor RHO to open the previously traced hold circuit for relay 640.

At the calling station relay 540 operates and locks over contacts 543 and lights the go-ahead lamp as previously described; grounds conductor SUP by way of contacts 542 to start oscillator OSC–2, holds relay 640 at contacts 545, and opens the circuit to interrupter relay 530 at contacts 546 which restores after a short delay because of the condenser C56 and resistor R56 connected thereto over contacts 534. Channel unit 2 at the calling station now transmits the second go-ahead signal to both the calling and called stations and at the calling station relay 210 restores to disconnect ground from conductor RHM but relay 640 at this time is held operated by relay 540.

Interrupter relay 540 at the calling station restores after an interval and at contacts 531 disconnects ground from conductor SUP to stop oscillator OSC–2 thereby terminating the second go-ahead signal. At contacts 532 the locking circuit to relay 540 is opened and this relay restores. The termination of the go-ahead signal causes reoperation of relay 210 which at contacts 211 again maintains relay 640 operated at the calling station. Relay 540 restores and extinguishes the go-ahead lamp at contacts 544, opens the hold circuit to relay 640 which is now held operated over grounded conductor RHM, and reoperates interrupter relay 530 at contacts 546.

At the called station and in response to the receipt of the heading information code characters the polar differential relay is operated in response to the received space and mark frequencies over the transmission circuit including line conductor L3, right-hand winding of coil 400, conductor 403, contacts 713, conductor 406, dial contacts 410, conductor 407, contacts 738, conductor L4, key contacts 879, and conductor L1. These space and mark frequencies are induced into the left-hand winding of coil 400 and over conductors RC2 and PA2 to channel unit 1 to operate polar differential relay 230 in accordance with the space and mark frequencies transmitted. Channel unit 2 filters out the space and mark frequencies with the result that relays 210 and 220 are maintained operated. No tone relay in channel unit 1, however, is restored to ground conductor NT3 to disable the time-out circuit.

In response to each transmitted mark frequency relay 230 closes contacts 231 to ground conductor PR3 and operates the Print Magnet 240 of the recording apparatus via contacts 741 and conductor KT2. The Print Magnet 240 records the transmitted character codes and controls the operation of the function selector at the called station in a manner similar to that described for the calling station. The start-of-message code enables operation of the function selector, the network and calling station code closes the distant station contacts DSC only in case the calling station is in the same network as the called station, and the end-of-message code disables further operation of the function selector.

The closure of contacts DSC at the called station completes a circuit for operating relay 830 as follows: from grounded contacts 639, conductor SSC, key contacts 862, conductor DSC3 included in cable CA, contacts 128, conductor DSC2 in cable CA, contacts DSC, contacts 844 and relay 830 to battery. Relay 830 locks operated over contacts 833 and 527, prepares a circuit for identity relay 840 at contacts 832, and at contacts 834 opens the circuit to relay 850 which restores. Relay 850 restores and at contacts 851 prepares a circuit for the rotary switch of FIG. 1. The no-tone relay 310 reoperates when message transmission is terminated to remove ground from conductor NT3.

When the second go-ahead signal transmitted from the calling station is received at the called station and sent through channel unit 2 the go-ahead relay 210 is restored to disconnect ground from conductor RHM at contacts 211 thereby opening the circuit to relay 640 which releases after an interval.

Relay 640 at the called station, upon restoring, at contacts 641 operates relay 560, at contacts 642 prepares a circuit for operating the rotary switch, at contacts 643 opens its normal holding circuit, and at contacts 644 disconnects its slow release network. Relay 560 locks over contacts 561 and 521, grounds the locking conductor C503 at contacts 562, and at contacts 565 and 566 switches the time-out circuit from the one minute to the ten seconds time out period.

When the second go-ahead signal is terminated relay 210 reoperates and completes circuits for operating the rotary switch oscillator OSC–1 at the called station as follows: ground contacts 211, conductor RHM, contacts 642, 716, and 781, conductor RH3, key contacts 863, contacts 851, 816 and 848, conductor WHL in cable CA, off-normal contacts 131, interrupter contacts 134 and motor magnet 130 to battery. A branch of this circuit extends from conductor WHL via rectifier D11 and conductor OSC for operating oscillator OSC–1 at the called station to send space frequency.

The rotary switch at the called station is operated in the same manner as described for the calling station to operate relay 120 and the distributor and send the heading information designated in Table B. This heading information is the same as Table A except that the station code of the called station is XB. The operation of relay 120 disconnects the tape reader and at contacts 129 grounds conductor RHO to reoperate relay 640 which now holds over contacts 211 and 643.

At the called station polar differential relay 230 responds to the transmission of the codes of the heading information and operates print magnet 240 by way of contacts 231, conductor PR3, key contacts 871 and 876, and conductor KT2 for each mark frequency transmitted. The print magnet 240 prints a corresponding record and enables the function selector to close the home station contacts HSC in response to the network and station code transmitted by the called station in a manner similar to that described for the calling station. In response to contacts HSC closing relay 810 is operated via contacts 845. Relay 810 operates, grounds conductor C503 at contacts 811, completes a circuit for operating identity relay 840 via contacts 812 and 832, and temporarily locks itself via contacts 813 and 842. Relay 840 operates, grounds conductor 503 at contacts 841, locks itself over contacts 843 and 527, at contacts 842 opens the locking circuit to relay 810 which now restores, opens the original circuit to relay 810 at contacts 845, opens a circuit to relay 850, opens the original circuit to the rotary switch at contacts 848, and prepares a circuit at contacts 847 for relay 630.

The rotary switch at the called station, after sending the heading information, is restored to normal thereby releasing the distributor clutch magnet 110, opening the circuit to oscillator OSC–1 to stop transmission, and completing a circuit to operate signal relay 540 before relay 120 restores in the same manner as described for the calling station.

Relay 540 at the called station operates and locks, holds relay 640 operated, opens the circuit to the interrupter relay 530, and starts oscillator OSC–2 to send the third go-ahead signal as previously described. The slow release relay 120 is restored to connect the tape reader and relay 210 restores in response to this go-ahead signal. After an interval, relay 530 restores to terminate this third go-ahead signal and cause the release of relay 540 as previously described. The termination of this go-ahead signal reoperates relay 210 which at contacts 211 holds relay 640 operated, and the release of relay 540 reoperates relay 530.

At the calling station and in response to the receipt of the heading information transmitted from the called station polar differential relay 230 is operated over the transmission circuit to operate print magnet 240 by way of contacts 231, conductor PR3, key contacts 871 and 876, and conductor KT2. The function selector is operated in the same manner as previously described but in this instance the distant station contacts DSC are closed in response to the receipt of the network and called station code from the called station. The closure of contacts DSC completes a circuit for operating relay 830 by way of grounded contacts 639, conductor SSC, key contacts 862, conductor DSC3 in cable CA, contacts 128, conductor DSC2 in cable A, contacts DSC, contacts 844, and relay 830 to battery. Relay 830 operates and locks over contacts 833 and 527 and at contacts 832 operates identity relay 840 by way of contacts 812. Relay 840 operates and locks over contacts 843 and 527 and at contacts 842 opens the locking circuit of relay 810 which restores. Relay 810 restores and prepares a circuit for relay 630 at contacts 816. It will be noted that when identification is required relays 840 at both the calling and called stations must be operated before the main body of the message can be transmitted by either station. The distant station contacts DSC are not closed by the function selector if the calling and called stations are in different networks and therefore the identity relay 840 is not operated to permit transmission of the body of the message. The function selector is released by the receipt of the end-of-message code. No-tone relay 310 reoperates when space and mark frequency terminates to enable the time-out circuit to function.

When the calling station receives the third go-ahead signal from the called station relay 210 is restored and at contacts 211 opens the circuit to relay 640 which restores after an interval. At contacts 642 relay 640 prepares a circuit for relay 630.

When the third go-ahead signal is terminated, relay 210 reoperates and completes the circuit for operating relay 630 as follows: ground, contacts 211, conductor RHM, contacts 642, 716 and 781, conductor RH3, key contacts 863, contacts 851, 816 and 847, key contacts 865, tape-out contacts 867, key contacts 882, conductor RH2, and lower winding of relay 630 to battery. Relay 630 at contacts 631 grounds conductor OSC to start oscillator OSC–1, at contacts 632 opens the circuit to slow-to-release clutch relay 750, at contacts 633 grounds the lock conductor C503, at contacts 634 connects ground by way of conductor RLM, contacts 524, 532, 621, 634, conductor RH3, contacts 863, 851, 816, 847, 865, 867, and 882, and conductor RH2 to hold relay 630 and to operate the transmitter clutch magnet 150 when relay 750 restores, at contacts 635 closes another hold circuit through the upper winding of relay 630 from the grounded conductor RLM, at contacts 635 reoperates relay 640 by way of contacts 211, conductor RHM, contacts 636, diode D62 and relay 640 to battery, at 637 extinguishes the receive lamp REC, at contacts 638 lights the send lamp SSL, and at contacts 639 disconnects ground from conductor SSC.

Clutch relay 750 restores and closes contacts 751 and connects grounded conductor RH2 to conductor CL1 in cable CA to operate the transmitter clutch magnet 150 to start the teletypewriter tape transmitter and close auxiliary contacts 151 to operate the distributor clutch magnet 110. The tape perforated with the body of the message is now fed through the tape reader in known manner. The coded perforations in the tape, as it advances, controls the tape reader contacts 141 to 145, inclusive, to ground the respective segments of the distributor and apply ground to the distributor brush in accordance with the coded character perforations, whenever the distributor brush is grounded by way of the tape reader contacts such as 141 to 145 and its corresponding segments. This ground is extended by way of conductor K2 in cable CA, key contacts 874 and 877 to conductor K1 to change the potential and cause channel unit 2 to shift from space to mark frequency transmission and transmit the message perforated in the tape to the calling and called stations.

At the calling station the transmitted message characters operate the polar differential relay 230 to control the print magnet 240 to print a record of the transmitted message. At the end of this message the tape-out contacts 867 open and the contacts 866 close and no-tone relay 310 reoperates to enable the time-out circuit. When the tape-out contacts 867 open the previously traced circuit to the transmitter clutch magnet 150 is opened to stop tape transmission, and the closure of tape-out contacts 866 completes a circuit for operating signal relay 540. This circuit extends from ground, contacts 221, conductor RLM, contacts 524, 532, 621, 634, conductor RH3, key contacts 863, contacts 851, 816, 847, key contacts 865, tape-out contacts 866, conductor SHT, contacts 715 and relay 540 to battery.

Signal relay 540 at the calling station operates, locks and holds relay 640, starts oscillator OSC–2 and opens the circuit to interrupter relay 530 as previously described. Oscillator OSC–2 operates and sends the fourth go-ahead signal to both the calling and called stations over the transmission circuit. Relay 540 at contacts 545 again holds relay 640 operated. Relay 210 at the calling station restores in response to the receipt of this go-ahead signal.

Interrupter relay 530 restores after an interval, and at contacts 532 opens the previously traced circuits for relays 540 and 630. At contacts 531 relay 530 opens the oscillator circuit to terminate the fourth go-ahead signal and cause reoperation of relay 210 which now operates to hold relay 640. Relay 540 restores and reoperates relay 530. Relay 630 at the calling station restores and at contacts 631 opens the circuit to oscillator OSC–1, at contacts 632 re-establishes the circuit to relay 750 which operates to open the clutch magnet circuit, and at contacts 638 and 637 extinguishes the send lamp SSL and lights the receive lamp REC.

The receipt of the space and mark frequencies of the message transmitted from the calling station operates polar relay 230 and print magnet 240 at the called station to record the message as before described. In response to the receipt of the fourth go-ahead signal at the called station relay 210 restores and causes relay 640 to restore after a short interval.

When the fourth go-ahead signal is terminated relay 210 at the called station reoperates and completes a circuit for operating relay 630 as follows: ground contacts 211, conductor RHM, contacts 642, 716 and 781, conductor RH3, key contacts 863, contacts 851, 816, and 847, key contacts 865, tape-out contacts 867, key contacts 882, conductor RH2 and relay 630 to battery. Relay 630 at contacts 631 grounds the conductor OSC to start oscillator OSC–1, at contacts 632 opens the circuit to clutch relay 750 which now restores, at contacts 634 prepares a circuit for relay 540 which is effective when the tape-out contacts operate, at contact 635 locks itself over contacts 621, 532 and 524 to grounded RLM conductor, at contacts 636 completes a circuit for operating relay 640 by way of rectifier D62, contacts 636 and 211, and at contacts 637 and 638 extinguishes the receive lamp REC, and lights the send lamp SSL. Relay 640 in operating re-establishes its original holding circuit. Relay 750 restores and at contacts 751 completes the circuit for operating the teletypewriter clutch magnet 150 as follows: from grounded conductor RLM, contacts 524, 532, 621, 634, conductor RH3, contacts 863, 851, 816, 847, and 865, tape-out contacts 867, key contacts 882, contacts 751, conductor CL1 in cable CA, and transmitter clutch magnet 150. Magnet 150 at the called station operates the tape transmitter and the auxiliary contacts 151 to operate the distributor clutch magnet 110 to operate the teletypewriter transmitter in the well-known manner.

At the called station oscillator OSC–1 is now transmitting the space frequency and as the tape is fed through the tape reader and senses the perforations in the tape the message is sent over the transmission circuit to both the calling and called stations and no-tone relay 310 is restored to ground conductor NT3 to disable the time-out circuit. Polar differential relay 230 at the called station operates the print magnet to record the transmitted message as previously described.

When the message has been transmitted the tape-out contacts operate and contacts 867 open the circuit to the transmitter clutch magnet 150 to stop further transmission. The closure of tape-out contacts 866 operates signal relay 540 as follows: from grounded RLM conductor, contacts 524, 532, 621, 634, conductor RH3, contacts 863, 851, 816, 847, 865, 866, conductor SHT, contacts 715, and relay 540 to battery. Relay 540 at contacts 542 again starts oscillator OSC–2, locks at contacts 543, lights the go-ahead lamp at contacts 544, holds relay 640 at contacts 545, and opens the circuit to interrupter relay 530 at contacts 546. Oscillator OSC–2 now transmits the fifth go-ahead signal to both the calling and called stations over the transmission circuit and relay 210 at the called station restores.

After a short interval relay 530 at the called station restores to open the oscillator circuit at contacts 531 to terminate the fifth go-ahead signal, and opens the circuits of relays 540 and 630 at contacts 532 to restore relays 540 and 630. Relay 210 at the called station reoperates in response to the termination of this go-ahead signal to hold relay 640 operated. Relay 540 restores and reoperates interrupter relay 530. Relay 630 restores and at contacts 631 opens the circuit to oscillator OSC–1. At contacts 632 relay 630 reoperates clutch relay 750 which at contacts 751 opens a further point in the circuit to the transmitter clutch magnet 150. Relay 630 at contacts 637 and 638 lights the receive lamp REC, and extinguishes the send lamp SSL.

The space and mark frequencies of the transmitted message from the called station are received at the calling station to operate relays 230 and 240 and restore relay 310 as previously described and the print magnet prints a record of the transmitted message.

At the calling station and in response to the receipt of the fifth go-ahead signal relay 210 restores and at contacts 211 opens the circuit to relay 640 which restores after a short interval. Relay 640 restores and at contacts 642 prepares a circuit for sending another message if one is to be sent, or prepares a circuit for signal relay 540 in case no further message is to be sent.

When the fifth go-ahead signal is terminated relay 210 at the calling station reoperates and completes a circuit for operating relay 630 in case another message is to be sent to the called station. In case another message is to be sent the tape-out contacts 867 are now closed and relay 630 is operated as follows: ground contacts 211, conductor RHM, contacts 642, 716, 781, conductor RH3, contacts 863, 851, 816, 847, 865, tape-out contacts 867, contacts 882, conductor RH2, and relay 630 to battery. The operation of relay 630 now starts oscillator OSC–1, releases relay 750, locks operated, reoperates relay 640, and lights the send lamp SSL, the release of relay 750 starts and completes message transmission after which another go-ahead signal is transmitted all as previously described.

In case the calling station does not have another message to send then the tape-out contacts are operated and tape-out contacts 866 are closed. Now, when the fifth go-ahead signal is terminated relay 210 reoperates and now completes a circuit for operating the signal relay 540 as follows: ground contacts 211, conductor RHM, contacts 642, 715 and 781, conductor RH3, contacts 863, 851, 816, 847, and 865, tape-out contacts 866, conductor SHT, contacts 715, and relay 540 to battery. In the same manner as previously described relays 540 and 530 cause the transmission of another go-ahead signal to enable the called station to transmit another message if it has one to send.

At the called station the receipt and termination of this other go-ahead signal causes the called station to send another message to the calling station in case it has another message to send, or causes the called station to transmit a further go-ahead signal in case it has no other message to send in the same manner as just described for the calling station. The calling and called stations continue to transmit these go-ahead signals back and forth until the time-out circuit is effective to cause the automatic release of the connection.

It will be remembered that during message transmission the no-tone relay 310 at both stations is restored to disable the time-out circuit by preventing the condenser C51 to receive a charge, that the relay 310 is operated during signal transmission to enable the time-out circuit by disconnecting ground from conductor NT3, and that relay 560 is operated to close the ten second time-out circuit. During the back and forth signal transmission condenser C51 is receiving a charge by way of battery, resistors R54 and R56, contacts 566 and 618′, resistor R51, condenser C51 to ground. In approximately ten seconds the condenser C51 has been charged to bias the base circuit of transistor TR to pass current. Current now flows in the collector-emitter circuit of transistor TR at each station to operate the time-out relay 510 at each station.

Time-out relay 510 at each station connects grounded conductor C503 over contacts 511 to operate release relay 520. Relay 520 operates and at contacts 521 opens the locking circuit of relay 560 to release this relay. At contacts 522 relay 520 locks itself operated until all ground connections to conductor C503 are removed. At contacts 523 connects grounded RLM conductor to relay 640 to operate relay 640 in case it is unoperated at this time. At contacts 524 disconnects grounded conductor RLM from the locking circuit of relay 540 to restore relay 540 in case it is operated. At contacts 526 opens the locking circuit of relay 730 at the called station to release this relay. At contacts 527 opens the locking circuits of relays 830 and 840 and relay 740 to release these relays. At contacts 528 opens the locking circuit to relay 720 at the calling station to release this relay.

Relay 560 restores and removes one ground from conductor C503 at contacts 562 and at contacts 566 opens the ten second time-out circuit. Relay 720 at the calling station restores and relay 730 at the called station restores to release motor relays 760 at both stations to stop the teletypewriter motors at contacts 721 and 731, at contacts 722 and 732 removes another ground from conductors C503, at contacts 724 and 734 extinguishes the busy lamps BSY and at contacts 725 and 736 opens the circuits to the receive or send lamps REC or SSL. Relay 720 at the calling station at contacts 726 opens the calling station loop including line conductors L1 and L3 to release the established connection in a well-known manner, at contacts 727 connects the called relay 730 across line conductors L1 and L3, and at contacts 729 grounds conductor NT3 to short circuit condenser C51 and disable the time-out circuit and release relay 510. Relay 730 at the called station on restoring opens a possible circuit to signal relay 540 at contacts 735, at contacts 738 opens the called station loop including conductors L1 and L3, at contact 737 bridges the called relay 730 across the called loop, at contacts 738′ prepares a circuit for the calling relay 720, and at contacts 737′ grounds conductor NT3 by way of contacts 729 to disable the time-out circuit at the called station to release relay 510. Relay 740 at the called station restores to remove another ground from conductor C503 at contacts 744, prepares a circuit for relay 540 at contacts 745, and opens the initial operating circuit to relay 850.

Relays 830 and 840 at both stations restore and at contacts 831 and 841 disconnect the last grounds from conductor C503 thereby opening the locking circuit of release relay 520 which now restores. Both stations are now in their idle condition with relays 210, 220, 530, 620 and 640 held operated over their respective circuits.

*No Identification Required*

It will now be assumed that station identification is not required at an unattended station and under this condition the identity key ID of the security circuit, FIG. 8, is operated to open contacts 865, 863, 862 and 861 to prevent such station from sending its heading information such as shown in Table A or B under control of the rotary switch shown in FIG. 1. The operation of the identity key also closes contacts 864 to prepare a new circuit for operating relay 630 which controls tape transmission.

Any calling station establishing a telephone connection to a called unattended station may receive the prepared message from such called station without the necessity of station identification in the following manner. A calling station operates its start key 771 to operate the calling relay 720 which causes operation of the teletypewriter motor, closes the calling loop over line conductors L1 and L3, lights the receive lamp REC, lights the busy lamp BSY, and enables the time-out circuit all as previously described. The calling station now dials the called station by way of the automatic central office and on completion of the connection connects ringing current to the called station.

At the called station ringing current operates the called relay 730 which locks, closes a direct current bridge across line conductors L1 and L3, starts the teletypewriter motor, enables the time-out circuit, lights the busy and receive lamps, and completes a circuit by way of contacts 745 and 735 for operating signal relay 540 as previously described.

Relay 540 at the called station operates oscillator OCS–2 to transmit a go-ahead signal, holds relay 640 operated, and opens the interrupter relay circuit which releases as before described. Relay 210 restores during transmission of the go-ahead signal and interrupter relay 530 restores after a time delay determined by its connected condenser C56 and resistor R56 network. When relay 530 restores it terminates the go-ahead signal, unlocks relay 540, and operates relay 740 as before. The termination of the go-ahead signal causes reoperation of relay 210 which holds relay 640 operated. Relay 740 operates, locks and opens the circuit to relay 540 which now restores and reoperates relay 530 as previously described.

At the calling station and as previously described the receipt of the go-ahead signal restores relay 210 which causes relay 640 to release after an interval. At contacts 641 relay 640 operates relay 560 which locks and enables the ten second time-out circuit. When the first go-ahead signal is terminated, relay 210 reoperates and completes a circuit, since the identity key is operated, for operating relay 630. This circuit may be traced from ground contacts 211, conductor RHM, contacts 642, 716 and 781, conductor RH3, the now closed contacts 864 of the identity key, tape-out contacts 867, key contacts 882, conductor RH2, and relay 630 to battery. Relay 630 operates and at contacts 631 starts oscillator OSC–1, at contacts 632 opens the circuit to clutch relay 750 which restores after a short interval, at contacts 634 prepares a circuit for operating the transmitter clutch magnet 150, at contacts 635 locks itself over its upper winding by way of contacts 621, 532 and 524 to grounded conductor RLM, and at contacts 636 completes a circuit through rectifier D62 and contacts 211 for reoperating relay 640. Clutch relay 750 restores and at contacts 751 completes the circuit for operating clutch magnet 150 from grounded conductor RLM, contacts 524, 532, 621, 634, conductor RH3, key contacts 864 of the identity key, tape-out contacts 867, key contacts 882, conductor RH2, contacts 751, conductor CL1 in cable CA, and clutch magnet 150 to battery. Magnet 150 starts the tape reader and operates auxiliary contacts 151 to operate the distributor clutch magnet 110. The perforated message is now sensed and the message perforated in the tape is now transmitted to both the called and calling stations as previously described.

In the calling station polar relay 230 and the print magnet operate to make a copy of the transmitted message and relay 310 restores during transmission to disable the time-out circuit.

After the message is sent from the calling station the tape-out contacts operate and contacts 867 open the circuit to the transmitter clutch magnet 150 to stop further transmission. Tape-out contacts 866 close and complete a circuit for operating signal relay 540 as follows: grounded conductor RLM, contacts 524, 532, 621, 634, conductor RH3, identity key contacts 864, tape-out contacts 866, conductor SHT, contacts 715, and relay 540 to battery. Relay 540 holds relay 640 operated, opens the circuit to interrupter relay 530, and starts oscillator OSC–2 to send the second go-ahead signal. Relay 210 at the calling and called stations restore in response to the receipt of this go-ahead signal.

After a short interval interrupter relay 530 at the calling station restores to stop oscillator OSC–2 and open the circuits to relays 540 and 630 and the circuit to clutch magnet 150 at contacts 532. Relay 540 restores and reoperates relay 530, relay 630 restores to stop oscillator OSC–1, and magnet 150 stops the transmitter. Relay 210 reoperates when the signal is terminated to hold relay 640 operated.

In case the calling station did not have a mesage to send as above described, then the tapeout contacts 866 are closed and instead of transmitting a message the calling station transmits a go-ahead signal in the manner set forth above.

At the called station the message transmitted from the calling station operates polar relay 230 and print magnet 240 to record the message as before. In response to the receipt of the go-ahead signal relay 210 at the called station restores and releases relay 640. In response to the termination of this signal relay 210 reoperates and operates relay 630 if it has a message to send, or if it has no message to send then the tape-out contacts 866 are closed and the called station then sends a go-ahead signal.

Assuming that the called station has a message to send to any calling station, then the tape-out contacts 867 are closed and relay 630 at the called station is operated over contacts 211, 642, 716, 781, 864, 867 and 882. In the same manner as described for the calling station the operation of relay 630 at the called station now causes its perforated message to be transmitted after which it transmits another go-ahead signal. In case the called station has no mesage to send then relay 540 is operated over tape-out contacts 866 to transmit the go-ahead signal.

In the same manner as previously described these go-ahead signals are transmitted back and forth until the time-out circuit is effective to release the connection.

If the calling station is set for no identification required, that is the identity key ID is operated, and the called station is set for identification required, that is, the identity key is normal, then the called station will only reply with a go-ahead signal and will not transmit any messages.

If the calling station is set for identification required, that is with the identity key normal, and the called station is set for no identification required, that is with the identity key operated; then the called station upon receipt of the go-ahead signal from the calling station will transmit its message.

*Preparing a Perforated Tape*

In order to prepare a message by punching a tape with the desired message, the prepare tape key PT, FIG. 8, is operated to open contacts 871 and 874 and close contacts 872 and 873 and the tape is prepared in the well-known manner. During tape preparation the station can receive incoming calls and the operator stops tape perforations to prevent interference with the incoming message. The closure of contacts 872 operates motor relay 760 to start the teletypewriter motor and contacts 873 connect the distributor and transmitter over conductor K2 and contacts 742 to the print magnet 240.

It will now be assumed that during tape preparation the station receives a call and that called relay 730 is operated by ringing current. Relay 730 at contacts 731 maintains relay 760 operated, at contacts 734 operates the busy lamp BSY, at contacts 735 operates signal relay 540, at contacts 736 operates the receive lamp REC, at contacts 738 bridges the station across line conductors L1 and L3, at contacts 739 locks, at contacts 739′ prepares the circuit to relay 740, at contacts 738′ opens the circuit to relay 720, and at contacts 737′ enables the timeout circuit in a manner apparent from the foregoing description.

When the operator observes the lighting of the busy BSY and receive REC lamps, tape perforation is terminated to prevent interference with the incoming message.

In the same manner as previously described relay 540 operates to start oscillator OSC–2 to send the first go-ahead signal, maintains relay 640 operated and opens the circuit of interrupter relay 530. Relay 210 restores without effect at this time. After an interval relay 530 restores, opens the circuit to oscillator OSC–2 to terminate the go-ahead signal and operates relay 740. Relay 740 operates to release relay 540 and operates relay 850 if identification is required. Relay 540 restores and reoperates interrupter relay 530. Relay 210 reoperates when the go-head signal is terminated to hold relay 640 operated. The receipt and termination of this go-ahead signal at the calling station causes the calling station to transmit its identity if identification is required or to transmit its perforated message if no identification is required in the same manner as previously described. It will be noted that contacts 741 are closed by relay 740 to enable the operation of print magnet 240 while contacts 871 are opened and that it is unnecessary for the operator to restore key PT during reception of message transmission. After the connection is released, the operator may resume preparation of the tape.

*Testing a Perforated Tape*

After the operator has prepared a tape and then desires to test the tape by transmitting the message locally to print and check the page copy. The operator then releases the prepare tape key PT and operates the test tape key TT, FIG. 8. During this testing operation no incoming calls can be received because the line loop is opened at contacts 879 thereby preventing the operation of the called relay 730.

When the test tape key TT is operated, contacts 875 complete the circuit for operating motor relay 160 to start the motor, at contacts 876 opens a circuit from polar relay contacts 231, at contacts 877 opens a circuit to the mark conductor K1 and the oscillator tank network, at contacts 878 connects the conductor K2 extending from the distributor brush by way of contacts 874, 878 and 742 to conductor KT2 and print magnet 240, at contacts 879 opens the incoming line loop over line L1 to prevent station seizure on an incoming call, at contacts 881 lights the busy lamp, at contacts 882 opens the circuit to relay 630 to prevent message transmission, and at contacts 883 and 884 completes a circuit for operating the transmitter clutch magnet 150. This circuit may be traced as follows: ground, contacts 883, tape-out contacts 867, contacts 884, conductor CL1 in cable CA, and clutch magnet 150. The transmitter clutch magnet operates the distributor clutch magnet 110 by way of auxiliary contacts 151 and the tape is read by the tape reader in the usual manner. As the tape is read ground pulses are transmitted from the tape reader contacts, such as contacts 141 to 145 inclusive, by way of the distributor brush, conductor K2 in cable CA, contacts 874 and 878, conductor KT1, contacts 742, conductor KT2 and winding of print magnet 240 to battery. The print magnet is operated in the well-known manner to print a page copy of the tape being tested.

It will be noted that contacts 879 of the test tape key TT is opened and this opens the circuit to called relay 730 over which ringing current operates relay 730 on an incoming call so that an incoming call cannot be received to interfere while a tape is being tested. The calling station attempting to reach this station will not receive a go-ahead signal indicating that the connection to this station is not established and will release the uncompleted connection thereto.

*Alarm*

An operator at either station can, at any time, initiate an alarm condition by momentarily operating the alarm button, FIG. 5. This causes a low alarm tone signal to be transmitted to the line and is received at both the calling and called stations. This alarm signal halts message transmission, prevents time-out, lights the alarm lamp ALL, operates a buzzer, and connects the telephone transmitters of both stations to the line to enable telephone conversation. After conversation, and when the alarm condition is cleared, either operator operates the "go-ahead" button, FIG. 7, to allow further message transmission. The following is a detailed description of the above stated functions.

It will be assumed that the operator at the calling station momentarily operates the alarm key to initiate an alarm. Alarm key contacts 572 complete a circuit for operating alarm relay 550 from ground contacts 211, conductor RHM, contacts 572 and relay 550 to battery. Relay 550 at contacts 551 disconnects ground from conductor FS to change the potential extending oscillator tank OSC–2 to cause the generation of a low alarm tone signal, at contacts 552 operates the alarm lamp ALL, at contacts 553 grounds conductor SUP via contacts 531 to start oscillator OSC–2 to generate the alarm signal, at contacts 554 holds relay 640 operated, at contacts 555 opens the circuit to interrupter relay 530 which restores after a short interval, and at contacts 556 completes its own locking circuit by way of contacts 616 and 525.

At the calling station the receipt of this alarm signal releases relay 220 while relay 210 is maintained operated. Relay 220 restores and at contacts 221 disconnects ground from conductor RLM to release relay 540 if operated, to release relay 630 if operated and thereby stop message transmission if the calling station is in transmitting condition. The disconnection of ground from conductor RLM also opens the holding circuit to relay 620 which now slowly restores due to the condenser C63 and resistor R63 networks connected thereto over contacts 623.

Relay 620 at the calling station restores after an interval and at contacts 621 opens further points in the locking circuits of relays 540 and 630 and in the circuit for operating the transmitter clutch magnet 150 thereby further disabling message transmission. Relay 620 at contacts 625 prepares a circuit for operating relay 610.

Interrupter relay 530 restores after an interval and at contacts 531 disconnects ground from conductor SUP to terminate the alarm signal and cause reoperation of relay 220. Relay 220 on reoperating again grounds conductor RLM to operate relay 610 by way of contacts 625. Relay 610 at contacts 612 completes another circuit for lamp ALL, at contacts 613 prepares a circuit for relay 560, at contacts 614 connects another ground to conductor C503, at contacts 615 prepares the locking circuit for relays 540 and 630, at contacts 616 opens the locking circuit of relay 550 to release relay 550 in case the alarm button contacts 572 are now open, at contacts 617 prepares a circuit for operating hook switch relay 710 in case the telephone has not been removed from its cradle, at contacts 618 completes its own locking circuit by way of contacts 646, 547 and 529, at contacts 619 completes a circuit for reoperating relay 620 from grounded conductor RLM and rectifier D61, at contacts 618′ disables the ten second time-out circuit and enables the one minute time-out circuit until relay 710 is operated, and at contacts 617′ operates the buzzer until relay 710 is operated by removal of the telephone handset from its cradle. At contacts 611 relay 610 ground conductor C200 to hold polar relay 230 inoperative to transmit pulses.

Relay 620 on reoperating prepares the locking circuits for relays 540 and 630 at contacts 621 and at contacts 624 locks itself by way of conductor RLM and diode D61. Relay 550 on restoring at contacts 551 grounds conductor FS to prepare for the transmission of a go-ahead signal, at contacts 552 opens the original circuit to lamp ALL now operated over contacts 612, at contacts 553 opens a further point in the circuit to conductor SUP, at contacts 554 opens one of the holding circuits to relay 640 which is now held over conductor RHM and contacts 642, at contacts 555 reoperates interrupter relay 530, and at contacts 556 opens a further point in its own locking circuit.

Interrupter relay 530 reoperates and at contacts 531 prepares the circuit for causing the transmission of a go-ahead signal, at contacts 532 prepares the locking circuits for relays 540 and 630, and at contacts 536 shunts contacts 547 to maintain relay 610 operated when relay 540 operates.

The operator removes the handset telephone from its cradle to close contacts 421 and 422 to operatively connect the telephone circuit and to operate the hook switch relay 710. The circuit for operating relay 710 extends from ground contacts 421, conductor 404, contacts 617 and lower winding of relay 710 to battery. In case the handset is removed from its cradle prior to the operation of relay 610 then when relay 610 operates contacts 617 of relay 610 it completes the circuit for operating relay 710. Relay 710 on operating at contacts 713 opens the circuit over conductor 403 to disconnect the repeat coil 400 from the line loop thereby preventing the reception of voice currents at the channel units. At contacts 711 relay 710 connects the telephone transmitter in the talking circuit and at contacts 712 bridges the talking circuit across line conductors L3 and L1. At contacts 714 relay 710 opens a point in the reset circuit for release relay 520, at contacts 715 opens a point in the circuit to signal relay 540, at contacts 716 opens another point in the circuit to relay 540, prepares a holding circuit for relay 710 which is ineffective at this time, at contacts 718 disables the time-out circuit by grounding conductor NT3, and at contacts 719 operates relay 650. Relay 650 locks operated over contacts 652 and 617′ and at contacts 651 opens the circuit to the buzzer.

At the called station the receipt of the alarm signal causes the operation of relays 220, 620, 610 and the buzzer as described for the calling station. When the telephone handset at the called station is removed in response to the operation of the buzzer relays 710 and 650 operate as described for the calling station thereby enabling the operators at both stations to converse.

After conversation both stations replace their handsets to open contacts 421 and 422 and after the alarm condition is cleared either station may operate its "go-ahead" push button. In response to the replacement of the handset contacts 421 open the circuit to relay 710 which restores and at contacts 711 disconnects the telephone transmitter T, at contacts 713 repeat coil 400 is reconnected in bridge of the line conductors L3 and L1 thereby inductively reconnecting the channel units to the established connection. At contacts 715 prepares a circuit for signal relay 540, at contacts 716 prepares a circuit for relay 630, and at contacts 718 enables the one minute time-out circuit.

When the alarm condition is cleared the operator momentarily operates the "go-ahead" push button to close contacts 772 and complete a circuit for operating signal relay 540 from grounded conductor RLM, conductor SHT and contacts 715. Relay 540 operates and locks over contacts 543, 615 and 524 to conductor RLM. Relay 540 at contacts 545 again holds relay 640, at contacts 546 opens the circuit to interrupter relay 530, at contacts 541 operates relay 560 via contacts 613 in case it is not at this time operated, at contacts 544 operates the go-ahead lamp, at contacts 547 opens one of the points in the locking circuit of relay 610, at contacts 548 maintains relay 620 operated, and at contacts 542 grounds conductor SUP to start oscillator OSC-2 to send a go-ahead signal.

At the calling station relay 210 restores in response to the transmission of this go-ahead signal and interrupter relay 530 restores after an interval. Relay 530 on restoring at contacts 531 terminates the go-ahead signal, at contacts 532 opens one of the locking circuits to relay 540, and at contacts 536 opens the locking circuit to relay 610 which now restores. Relay 610 on restoring at contacts 536 disconnects ground from conductor C200, at contacts 612 extinguishes the alarm lamp ALL, at contacts 615 opens the locking circuit to relay 540 which now restores, at contacts 619′ and 618′ switches from the 1 minute to the ten second time-out circuit, at contacts 617′ restores relay 650, and at contacts 617 opens the circuit to relay 710 if operated. Relay 540 on restoring at the calling station reoperates interrupter relay via contacts 546 and 555.

In response to the receipt of the go-ahead signal at the called station relay 210 restores and relay 640 releases after an interval. Relay 642 at contacts 641 operates relay 560 in case it is not already operated and at contacts 646 opens the locking circuit of relay 610 which now restores. Relay 610 on restoring at contacts 611 disconnects ground from conductor C200, at contacts 612 extinguishes alarm lamp ALL, at contacts 617 opens the circuit to relay 710, at contacts 619′ and 618′ switches to the ten second time-out circuit, and at contacts 617′ releases relay 650.

When the go-ahead signal is terminated relay 210 at the called station reoperates and completes a circuit for operating relay 630 as follows: ground, contacts 211, conductor RHM, contacts 642, 716 and 781, conductor RH3, contacts 863, 851, 816, 847 and 865, tape-out contacts 867, contacts 882, conductor RH2 and lower winding of relay 630 to battery.

In case the tape-out contacts 866 are closed then the signal relay 540, instead of relay 630, is operated via conductor SHT and contacts 715 to cause the called station to transmit a go-ahead signal. Also, in case the identity key is operated then relay 630 or relay 540 is operated dependent upon the condition of the tape-out contacts.

Assuming that relay 630 at the called station is operated by relay 210 when the go-ahead signal is terminated as described above, then relay 630 on operating at contacts 631 starts the oscillator OSC–1, at contacts 632 releases clutch relay 750 which restores to close the circuit to the transmitter clutch magnet 150 at contacts 751. Relay 630 at contacts 634 grounds conductor RH3, conductor RH2 and conductor CL1 via 751 to operate the transmitter clutch magnet 150 until the tape-out contacts operate, at contacts 635 locks itself to grounded conductor RLM, at contacts 636 completes a circuit for operating relay 640 by way of conductor RHM and rectifier D62, at contacts 637 darkens the receive lamp REC, and at contacts 638 lights the send lamp SSL. The transmitter clutch magnet 150 closes contacts 151 to operate the distributor magnet 110 and the tape is now fed through the tape reader to transmit the remaining or the entire message to both the calling and called stations as previously described.

In case the alarm condition is not answered within one minute then the time-out circuit is effective and condenser C51 is charged from battery, resistors R54 and R55, contacts 619', resistor R51, and condenser C51 to ground. When the condenser charges to a predetermined potential the transistor TR conducts and operates time-out relay 510 which in turn operates release relay 520 by way of contacts 511. Release relay 520 on operating releases the apparatus and connection as previously described.

In case the called station initiates the alarm and the attendant thereat pushes the alarm button then contacts 572 operate relay 550 and cause the oscillator OSC–2 at the called station to transmit the alarm signal. This results in an operation similar to that just described for the calling station. After the alarm condition is cleared the operator operates the go-ahead button to operate signal relay 540 to cause the called station to transmit a go-ahead signal. This go-ahead signal causes resumption of message transmitting in a manner obvious from the foregoing description.

*Delayed Alarm*

The delayed alarm lever key (FIG. 7) is provided to enable the sending of an alarm signal to the distant station upon receipt of a go-ahead signal from the distant station so that the operators may discuss a message before it is transmitted.

Operation of the delayed alarm key opens contacts 781 and closes contacts 782 and 783. The opening of contacts 781 opens the circuit to relay 630 to prevent its operation when a go-ahead signal is received and terminated. Closure of contacts 783 operates the delayed alarm lamp DAL and contacts 782 prepare a circuit for the alarm relay 550.

When the go-ahead signal is received from the distant station, relay 210 restores causing relay 640 to restore and when the go-ahead signal is terminated relay 210 reoperates and completes the circuit for operating relay 550. This circuit may be traced as follows: ground, contacts 211, conductor RHM, contacts 642, 716 and 782, and relay 550 to battery. Relay 550 operates and sends the alarm signal as previously described for an alarm condition. When the operators answer both telephone transmitters T are included in the talking circuit when the hook switch relay 710 operates.

After conversation the delay alarm key is restored and the go-ahead button is pressed to cause transmission of the message as previously described.

*Dial Control Key*

In case it is necessary to place a call through a telephone operator for a long distance call or through a manual telephone exchange, then the dial control key and the start button are operated and the handset is removed from the cradle.

The operation of the dial control key closes contacts 772 to prepare a circuit for relay 610 and contacts 773 prepares a circuit for controlling relays 640 and 710. The operation of the start key operates calling relay 720 to operate relay 760 to start the teletypewriter motor, lights the busy lamp BSY, closes the line loop, lights the receive lamp, locks itself, and enables the time-out circuit all as previously described. The removal of the handset from its cradle operates the switch hook contacts 421 to complete a circuit for operating relay 610 and contacts 422 bridge the dial across line conductors L3 and L1.

The circuit for operating relay 610 may be traced from ground, contacts 421, conductor 404, operated key contacts 775, contacts 747 and 564, and relay 610 to battery. Relay 610 at contacts 612 lights the alarm lamp, at contacts 618 locks itself, at contacts 617' operates the buzzer, and at contacts 617 completes the circuit for operating relay 710 by way of contacts 421, conductor 404, and contacts 617. Relay 710 in operating at contacts 711 includes the telephone transmitter T in the talking circuit, at contacts 713 opens the loop circuit extending to the right-hand winding of repeat coil 400, and at contacts 712 connects the telephone talking circuit including transmitter T and receiver R across the line conductors L3 and L1. At contacts 715 relay 710 opens a circuit to relay 540, at contacts 716 opens the circuit to the rotary switch or to relay 630 dependent upon the operated condition of identity key ID, at contacts 717 prepares a hold circuit for relay 717 which is effective when the go-ahead button closes contacts 773, at contacts 718 disables the time-out circuit, and at contacts 719 operates relay 650 which locks operated and silences the buzzer.

The calling station may dial the telephone operator, or may complete the connection to the telephone operator in any well-known manner. The telephone operator then completes the connection to the called station and rings the called station.

When the called station is rung by the telephone operator, relays 730, 760, 540, 210, 530, 740 and 850 all operate in the same manner as previously described. Briefly, ringing current operates relay 730 which in turn operates relays 540 and 760 to send a go-ahead signal and start the teletypewriter motor; relay 540 opens the interrupter relay 530 circuit which restores after an interval to terminate the go-ahead signal and operates relay 740; relay 740 releases relay 540 and operates relay 850; relay 540 restores and reoperates interrupter relay 530, relay 210 restores in response to receipt of the go-ahead signal and reoperates when the go-ahead is terminated. This go-ahead signal transmitted from the called station is sent through the telephone receiver at the calling station and is not sent through channel unit 1 at the calling station because relay 710 at the calling station is still operated and the circuit of coil 400 is opened at contacts 713.

When the calling station hears this go-ahead signal in the telephone receiver, the handset is replaced on the cradle thereby opening contacts 421 but relay 710 at the calling station is now held operated from ground, contacts 529, 536, 646, 618, 564 and 747, key contacts 775, contacts 617, and lower winding of relay 710. The calling station now momentarily operates the go-ahead button which closes contacts 773 and extends ground from contacts 774 and through contacts 717 to the upper winding of relay 710 to hold relay 710 operated. Closure of contacts 773 also completes a short circuit for releasing relay 640 as follows: from ground, contacts 774 of the operated dial control key, contacts 773 of the go-ahead button, contacts 563 to the right-hand terminal of relay 640 and from the left-hand terminal, rectifier D62, contacts 643, conductor RHM, to ground at contacts 211. Relay 640 restores, at contacts 641 operates relay 560, at contacts 642 prepares a circuit to conductor RH3, and at contacts 646 opens the circuit to relay 610 and to the lower winding of relay 710. Relay 710 is now held operated over contacts 717, 773 and 774.

Relay 610 on restoring at contacts 617 opens the circuit to the lower winding of relay 710, at contacts 618 opens its own locking circuit, at 612 extinguishes the alarm lamp ALL to advise the calling station that the go-ahead button may now be released, at contacts 618′ and 619′ switches the time-out circuit, and at contacts 617′ unlocks relay 650. Relay 560 on operating at contacts 561 locks over contacts 521, at contacts 563 opens the short-circuit around relay 640 and at contacts 566 prepares the ten seconds time-out circuit.

When the alarm lamp ALL goes dark the operator releases the go-ahead button thereby opening contacts 773 to open the locking circuit of relay 710 and causes its release after which the operator may restore the dial control key. Relay 710 on restoring at contacts 711 disconnects the telephone receiver T, at contacts 713 reconnects coil 400 to line conductors L3 and L1 to complete the transmission circuit, at contacts 715 prepares a circuit for relay 540, at contacts 717 opens its own lock circuit, at contacts 718 enables the time-out circuit, at contacts 719 releases relay 650, and at contacts 716 completes a circuit for operating the rotary switch, FIG. 1, in case the identity key ID is normal, or completes a circuit for operating relay 630 if the identity key ID is operated. The circuit for operating the rotary magnet 130 of the rotary switch extends from ground, contacts 211, conductor RHM, contacts 642, 716, 781, conductor RH3, contacts 863, 851, 816, 848, conductor WHL, contacts 131 and 134 and motor magnet 130 to battery. The circuit for operating relay 630 extends over the same circuit to conductor RH3 and then by way of closed contacts 864 of the operated identity key, tape-out contacts 867, key contacts 882 and conductor RH2 to the lower winding of relay 630. Transmission will now begin with the identification code if required or with the message proper if identification is not required in the same manner as previously described.

*Reset*

A reset button is provided to enable a station to release the equipment and connection at any time. Momentary operation of the reset button closes contacts 791 to operate release relay 520. Relay 520 locks operated until all operated and locked relays have restored thereby releasing the equipment and the established connection as previously described.

What is claimed is:

1. In a telephone system, a calling station, a called station, means for automatically establishing a connection from said calling station to said called station and for automatically signaling said called station, control signal transmitting means and character signal transmitting means at each said station, control signal receiving means and character signal receiving means at each said station; a rotary switch at each said station having bank contacts marked with character signal codes designating a start-of-message code, a network code, an individual station code, and an end-of-message code; said network code with said station codes designating all the stations included in the network which are permitted to automatically send and automatically receive telegraph messages from such network stations; a function selector at each said station, means at said called station operated in response to the establishment of said connection and the signaling of said called station for operating said called station control signal transmitting means to transmit a first go-ahead signal over said connection to said calling station; said control signal receiving means at said calling station operated responsive to the receipt of said first go-ahead signal for operating said calling station rotary switch and the calling station character signal transmitting means to transmit the start-of-message code, the network code, the individual calling station code, and the end-of-message code to said calling station character signal receiving means and over said connection to said called station character signal receiving means; said calling station character signal receiving means operated responsive to the receipt of said calling station transmitted codes for operating the calling station function selector to stop further character signal transmission by said calling station rotary switch and character signal transmitting means and for thereafter operating said calling station control signal transmitting means to transmit a second go-ahead signal over said connection to said called station, said called station character signal receiving means operated in response to the receipt of said transmitted calling station codes for operating said called station function selector to identify the network of said calling station; said called station control signal receiving means operated responsive to the receipt of said second go-ahead signal for operating said called station rotary switch and the called station character transmitting means to transmit the start-of-message code, the network code, the individual called station code, and the end-of-message code marked in the banks of the called rotary switch to said called station character signal receiving means and over said connection to said calling station character signal receiving means; said called station character signal receiving means operated by the receipt of said called station transmitted codes for operating said called station function selector to stop further character signal transmission by said called station rotary switch and character signal transmitting means and for thereafter operating said called station control signal transmitting means to transmit a third go-ahead signal over said connection to said calling station, said calling station control signal receiving means operated responsive to the receipt of said third go-ahead signal for operating said calling station character signal transmitting means to transmit a prepared telegraph message over said connection to said called station.

2. A telephone system as claimed in claim 1 including means for operating said calling station control signal transmitting means after transmission of said prepared telegraph message to transmit a fourth go-ahead signal over said connection to said called station.

3. A telephone system as claimed in claim 2 including means for operating said called station control signal receiving means in response to the receipt of said fourth go-ahead signal for operating said called station character signal transmitting means to transmit a prepared telegraph message over said connection to said calling station.

4. A telephone system as claimed in claim 3 including means for operating said called station control signal transmitting means after transmission of said called station prepared telegraph message to transmit a fifth go-ahead signal to said calling station.

5. A telephone system as claimed in claim 3 including means for operating said called station control signal transmitting means in response to the receipt of said fourth go-ahead signal to transmit a fifth go-ahead signal to said calling station in case said called station has no prepared telegraph message to send.

6. A telephone system as claimed in claim 1 including means at said called station controlled by said function selector for disabling the operation of said rotary switch and said called station character signal transmitting means in the event said network code received by said called station from said calling station indicates that said calling station is in a different network than said called station to thereby terminate telegraph message transmission.

7. In a telephone system, a calling station, a called station, telegraph transmitting means at said calling station including a rotary switch having markings on its bank contacts comprising a network code and a station code individual to said calling station, telegraph transmitting means at said called station including a rotary switch having coded markings on its bank contacts comprising said network code and a station code individual to said called station, means for automatically establishing a connection from said calling station to said called station and for ringing said called station, means at said called station operated responsive to the establishment of said connection and the ringing of said called station for automatically signaling said calling station over said established connection, means at said calling station operated responsive to said signaling for operating said telegraph transmitting means and said rotary switch thereat to transmit said network code and said calling station code in accordance with said coded markings on said bank contacts at said calling station to said called station, means at said calling station automatically operated after the transmission of said network and calling station codes for terminating the transmission from said calling station and for automatically transmitting a signal to said called station, means at said called station operated responsive to the receipt of said network code and said calling station code and said signal for operating the telegraph transmitting means and said rotary switch thereat to transmit said network code and the called station code in accordance with said coded markings on said banks to said called station, means at said called station automatically operated after the receipt of said network and called station codes for transmitting a signal to said calling station, and means at said calling station operated responsive to the receipt of said network and called station codes and said last signal for operating said telegraph transmitting means at said calling station to transmit a telegraph message to said called station.

8. In a telephone system, a calling station, a called station, means for establishing a connection from said calling station to said called station, calling station transmitting means including a rotary switch having identification coded markings on its bank contacts identifying the network of stations including said calling station and individually identifying the calling station, called station transmitting means including a rotary switch having identification coded marking on its bank contacts identifying the network of stations including said called station and individually identifying the called station, means responsive to the establishment of said connection for operating said calling station transmitting means and said rotary switch to transmit said calling station network and station codes over said connection to said called station, called station receiving means operated in response to the receipt of said calling station network and station codes for operating said called station transmitting means and said rotary switch to transmit said called station network and station codes over said connection to said calling station, calling station receiving means operated in response to the receipt of said called station network and station codes, means operative in case said transmitted identification codes indicate that said calling and called stations are included in the same network of stations for causing said calling and called station transmitting means to transmit telegraph messages over said connection, and other means operative in case said transmitted identification codes indicate that the calling and called stations are in different networks and are unauthorized to transmit and receive telegraph messages between such stations for automatically preventing the transmission of telegraph messages between such stations.

9. In a telephone system of the type wherein a calling and a called station are each equipped with telegraph transmitting and receiving equipment and wherein ringing current is extended to said called station on the establishment of a connection from said calling station to said called station and wherein said called station is automatically operated in response to the receipt of ringing current for transmitting a signal over said connection to said calling station; the improvement comprising identification means at each said station comprising a rotary switch having coded markings on its bank contacts identifying the network code including said stations and the individual station code of said stations, means at said calling station operated responsive to the receipt of said signal for operating said telegraph transmitting and receiving equipment and said rotary switch at said calling station to transmit said network code and said calling station code corresponding to said coded network and station markings on said bank contacts at said calling station to said called station, and means at said called station automaticlly operated after receipt of said network and calling station codes for operating said telegraph transmitting and receiving equipment at said called station to transmit a telegraph message to said calling station.

10. In a telephone system of the type wherein a calling station is equipped with telegraph transmitting equipment for transmitting a network code and its own station code to a called station in the same network responsive to the completion of a connection from said calling station to said called station and said called station is equipped with telegraph transmitting equipment for transmitting the same network code and its own station code to said calling station and wherein said called station transmitting equipment is enabled to transmit only in the event the network code transmitted from said calling station indicates that said calling station is in the same network as said called station; the improvement comprising a rotary switch at each station having bank contacts marked with the network and station codes for controlling said telegraph transmitting equipment to transmit said network and station codes.

11. A telephone system as claimed in claim 10 including a circuit for initiating the operation of said rotary switch completed only in case the network code transmitted from said calling station corresponds to the network including said called station.

12. A telephone system as claimed in claim 11 including an identification key and wherein said identification key in its normal unoperated condition requires the calling station to identify itself as being in the same network as said called station before the called station can transmit a prepared telegraph message, and means controlled by the operation of said identification key for opening said circuit to said rotary switch to prevent its operation and for enabling said called station to transmit its prepared telegraph message to any calling station irrespective of the network including said calling station.

13. In a telephone system of the type wherein a station is provided with telegraph receiving and transmitting equipment including a keyboard for preparing a telegraph message by marking coded characters in a member and for thereafter transmitting said prepared message over a transmission circuit, a prepared message key at said station operated to enable a telegraph message to be prepared in said member by operation of said keyboard by an operator and to connect said keyboard to a page printer included in said telegraph receiving equipment to record the preparing of said message from said keyboard, seizure means operated for seizing said station during message preparation in response to the receipt of an incoming call, means for visually indicating said seizure to advise the operator to stop said message preparation, and switching means at said station operated responsive to the operation of said seizure means for switching said page printer from connection with said keyboard and for connecting said page printer to said telegraph receiving equipment to enable said page printer to record an incoming telegraph message transmitted over said transmission circuit from a calling station.

14. A telephone system as claimed in claim 13 including contacts operated by said operated prepare message key for disabling said telegraph transmitting equipment to transmit said message over said transmission circuit during the preparation of said message.

15. A telephone system as claimed in claim 13 wherein said seizure means comprises a first relay operated by the application of ringing current on an incoming call.

16. A telephone system as claimed in claim 15 wherein said switching means includes relay means operative responsive to the operation of said first relay.

17. A telephone system as claimed in claim 16 wherein means is provided to delay the operation of said relay means for a predetermined time interval after operation of said first relay.

18. In a telephone system of the type wherein a station is provided with telegraph receiving and transmitting equipment including a page printer for recording transmitted telegraph messages received over a transmission circuit, a test message key at said station having contacts operated during the testing of a prepared telegraph message at said station to enable said prepared telegraph message to be tested locally independent of said transmission circuit, and means including other contacts operated by said operated test message key to disable said transmission circuit and prevent seizure of said station on an incoming call to said station during message testing.

19. A telephone system as claimed in claim 18 wherein said station is normally seized over a connection including line conductors extending from said station to a telephone office and said other contacts open said connection to said office to prevent seizure and message transmission to said telephone office during testing.

20. In a telephone system wherein during transmission of telegraph signals between calling and called stations connected over an established telephone connection and the transmission circuit at each station, a monitoring circuit including only the receivers of the telephone handsets at said stations are connected to said telephone connection and said transmission circuit and the telephone transmitters of said handsets are excluded therefrom, and wherein means is provided at either station to transmit an alarm signal over said connections to both said stations and for indicating an alarm condition at each station, including first means at each station operated responsive to the removal of the telephone handset from its cradle only in case an alarm condition exists, and second means operated by said first means at each station for disconnecting said transmission circuit from said telephone connection and for completing a talking circuit including said telephone transmitter and receiver and said telephone connection to enable conversation between the operator's at said stations.

21. A telephone system as claimed in claim 20 including means operative during the existance of an alarm condition for terminating the transmission of telegraph messages.

22. A telephone system as claimed in claim 21 wherein after an alarm condition is cleared the telephone handsets are replaced thereby restoring said first and second means to reconnect said transmission circuit to said telephone connection and to disable said talking circuit by disconnecting said telephone transmitter, operator controlled means for thereafter transmitting a go-ahead signal to both said stations and for terminating said go-ahead signal, and means responsive to the receipt and termination of said go-ahead signal for resuming the transmission of telegraph signals.

23. In a telephone system of the type wherein a calling and a called station are each equipped with telegraph transmitting and receiving equipment and wherein ringing current is extended to said called station on the establishment of a connection from said calling station to said called station and wherein said called station is automatically operated in response to the receipt of ringing current for transmitting a go-ahead signal over said connection to automatically initiate the transmission of telegraph signals from said calling station in case said established connection is completed automatically by the attendant at the calling station dialing the called station telephone number; and means operated by the attendant at said calling station in case the connection is to be manually completed by a telephone operator for preventing the automatic initiation of telegraph signal transmission from said calling station in response to the receipt of said go-ahead signal.

24. A telephone system as claimed in claim 23 wherein said means operated by the attendant enables the attendant to hear said go-ahead signal transmitted from said called station.

25. A telephone system as claimed in claim 24 including means manually operated by the calling station attendant after hearing said go-ahead signal for initiating the transmission of telegraph signals from said calling station.

26. A telephone system as claimed in claim 24 wherein said means operated by said attendant includes a dial control key, a telephone handset and cradle contacts, and a plurality of relays.

27. A telephone system as claimed in claim 25 wherein said manually controlled means for initiating the transmission of telegraph signals from said calling station includes a manually operated go-ahead button jointly cooperating with an operated dial control key and a plurality of relays.

No references cited.